United States Patent

Wachter et al.

(10) Patent No.: US 9,125,018 B2
(45) Date of Patent: Sep. 1, 2015

(54) TRIGGERED LOCATION SERVICES

(75) Inventors: Andreas K. Wachter, San Francisco, CA (US); Stephen W. Edge, Escondido, CA (US); Kirk Allan Burroughs, Alamo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 12/702,159

(22) Filed: Feb. 8, 2010

(65) Prior Publication Data

US 2010/0203902 A1 Aug. 12, 2010

Related U.S. Application Data

(60) Provisional application No. 61/151,089, filed on Feb. 9, 2009.

(51) Int. Cl.
*H04W 24/00* (2009.01)
*G01S 19/48* (2010.01)
*H04W 4/02* (2009.01)
(Continued)

(52) U.S. Cl.
CPC .............. *H04W 4/022* (2013.01); *H04L 67/18* (2013.01); *H04W 4/023* (2013.01); *H04W 4/027* (2013.01); *H04W 4/20* (2013.01)

(58) Field of Classification Search
CPC ............................. H04W 48/18; H04W 48/16
USPC ........................................................ 455/456.1
See application file for complete search history.

(56) References Cited

U.S. PATENT DOCUMENTS 5,155,689 A * 10/1992 Wortham ................... 455/456.3
7,831,264 B2   11/2010 Miegel
(Continued)

FOREIGN PATENT DOCUMENTS

CN   1859798 A   11/2006
EP   2007149     12/2008
(Continued)

OTHER PUBLICATIONS

International Search Report and Written Opinion—PCT/US2010/023664, International Search Authority—European Patent Office—Oct. 18, 2010.
(Continued)

*Primary Examiner* — Lester Kincaid
*Assistant Examiner* — Andy Gu
(74) *Attorney, Agent, or Firm* — Arnold J. Gum

(57) ABSTRACT

Techniques for supporting triggered location services are described. In one design, at least one location related measurement for a terminal may be obtained and used to detect for a trigger event. For an equidistance triggered service, a trigger event may be declared if the distance traveled by the terminal exceeds a predefined distance. For a relative terminal to terminal triggered service, a trigger event may be declared if the terminal is inside or outside, or enters, or leaves a moving geographical target area defined by a reference terminal. For a velocity triggered service, a trigger event may be declared if the maximum velocity of the terminal exceeds a predefined velocity. For a time-distance-velocity combination triggered service, a trigger event may be declared based on distance traveled by the terminal, velocity of the terminal, and time since the last report. For all services, a report may be sent if a trigger event has occurred.

12 Claims, 10 Drawing Sheets

(51) Int. Cl.
*H04W 4/20* (2009.01)
*H04L 29/08* (2006.01)

(56) References Cited

U.S. PATENT DOCUMENTS

| | | | |
|---|---|---|---|
| 8,121,615 B2* | 2/2012 | Carpio et al. | 455/456.1 |
| 8,320,936 B2* | 11/2012 | Reitsma | 455/456.1 |
| 2003/0020623 A1 | 1/2003 | Cao et al. | |
| 2003/0060214 A1* | 3/2003 | Hendrey et al. | 455/456 |
| 2004/0160359 A1* | 8/2004 | Kanerva | 342/357.08 |
| 2004/0177068 A1 | 9/2004 | Beretich, Jr. et al. | |
| 2004/0214524 A1 | 10/2004 | Noda et al. | |
| 2005/0020277 A1 | 1/2005 | Krumm et al. | |
| 2005/0090951 A1* | 4/2005 | Good | 701/29 |
| 2005/0156718 A1 | 7/2005 | Flick | |
| 2006/0224300 A1 | 10/2006 | Shioya et al. | |
| 2006/0234727 A1* | 10/2006 | Ashley et al. | 455/456.4 |
| 2006/0258369 A1* | 11/2006 | Burroughs et al. | 455/456.1 |
| 2006/0258371 A1 | 11/2006 | Krishnamurthi et al. | |
| 2007/0004429 A1* | 1/2007 | Edge et al. | 455/456.1 |
| 2007/0026871 A1* | 2/2007 | Wager | 455/456.1 |
| 2007/0037585 A1 | 2/2007 | Shim | |
| 2007/0112504 A1* | 5/2007 | Krause et al. | 701/200 |
| 2007/0182547 A1* | 8/2007 | Wachter et al. | 340/539.13 |
| 2007/0206549 A1 | 9/2007 | Kallqvist | |
| 2008/0014962 A1* | 1/2008 | Shim | 455/456.1 |
| 2008/0014964 A1* | 1/2008 | Sudit et al. | 455/456.1 |
| 2008/0064446 A1 | 3/2008 | Camp et al. | |
| 2008/0068255 A1 | 3/2008 | Yang et al. | |
| 2008/0114538 A1* | 5/2008 | Lindroos | 701/208 |
| 2008/0186165 A1* | 8/2008 | Bertagna et al. | 340/539.13 |
| 2008/0218405 A1 | 9/2008 | Eckhart | |
| 2008/0242311 A1 | 10/2008 | Craine et al. | |
| 2009/0002147 A1 | 1/2009 | Bloebaum et al. | |
| 2009/0098887 A1 | 4/2009 | Baek | |
| 2009/0143079 A1 | 6/2009 | Klassen et al. | |
| 2009/0181638 A1* | 7/2009 | Gottlieb | 455/404.1 |
| 2010/0062752 A1 | 3/2010 | Shim | |
| 2010/0130213 A1* | 5/2010 | Vendrow et al. | 455/445 |
| 2011/0081868 A1* | 4/2011 | Kim et al. | 455/67.11 |
| 2012/0202524 A1 | 8/2012 | Wachter et al. | |

FOREIGN PATENT DOCUMENTS

| | | |
|---|---|---|
| JP | H1175244 A | 3/1999 |
| JP | 2008245286 A | 10/2008 |
| JP | 2009503915 A | 1/2009 |
| RU | 2337498 C2 | 10/2008 |
| WO | WO2006118401 | 11/2006 |
| WO | WO-2006118404 A1 | 11/2006 |
| WO | WO-2006128484 A1 | 12/2006 |
| WO | WO2007018408 | 2/2007 |
| WO | WO2007086702 | 8/2007 |
| WO | WO-2008063823 A1 | 5/2008 |

OTHER PUBLICATIONS

TIA/EIA: "Position Determination Service Standard for Dual Mode Spread Spectrum Systems; TIA/EIA/IS-801" Nov. 1, 1999, Telecommunications Industry Association, TIA/EIA, XP017003091.
Bertinetti D., et al., "OMA-LOC-2006-0190R01-INP_SUPL_2_0_TS_Trigger_Type", OMA-LOC-2006-0190R01-INP_SUPL_2_0_TS_Trigger_Type, OMA, Aug. 11, 2006.
Busin A., et al.,"LOCSIP AD, Add service flows for trigger services", OMA-LOC-2008-0365-CR_LOCSIP_1_0_AD_Trigger, OMA, Jun. 17, 2008.
Choi J., et al.,"SET to SET Triggered Service",OMA-LOC-2006-0036- IC-SUPL-V2_0-SET-to-SET-Triggered-Service, OMA, Jan. 30, 2006.
European Search Report—EP12002221—Search Authority—Munich—Jun. 6, 2012.
Taiwan Search Report—TW099104032—TIPO—Mar. 5, 2013.
Tran K., "Area Event Trigger Examples", OMA-LOC-2008-0160-CR_SUPL2_0_Area_Event_Trigger_Examples, OMA, Feb. 23, 2008.
Wachter A., et al.,"SUPL 2.0 AD Area Event Triggered Services for NI Proxy", OMA-LOC-2006-0013-CR-SUPL-2_0-AD-Area-Event-Triggered-Services-for-NI-Proxy ,OMA, Jan. 27, 2006.
3GPP2 C.S0022-0, Version 3.0, 3rd Generation Partnership Project 2 "3GPP2", "Position Determination Service Standard for Dual Mode Spread Spectrum Systems," Feb. 16, 2001.
Taiwan Search Report—TW99104032—TIPO—Sep. 25, 2013.

* cited by examiner

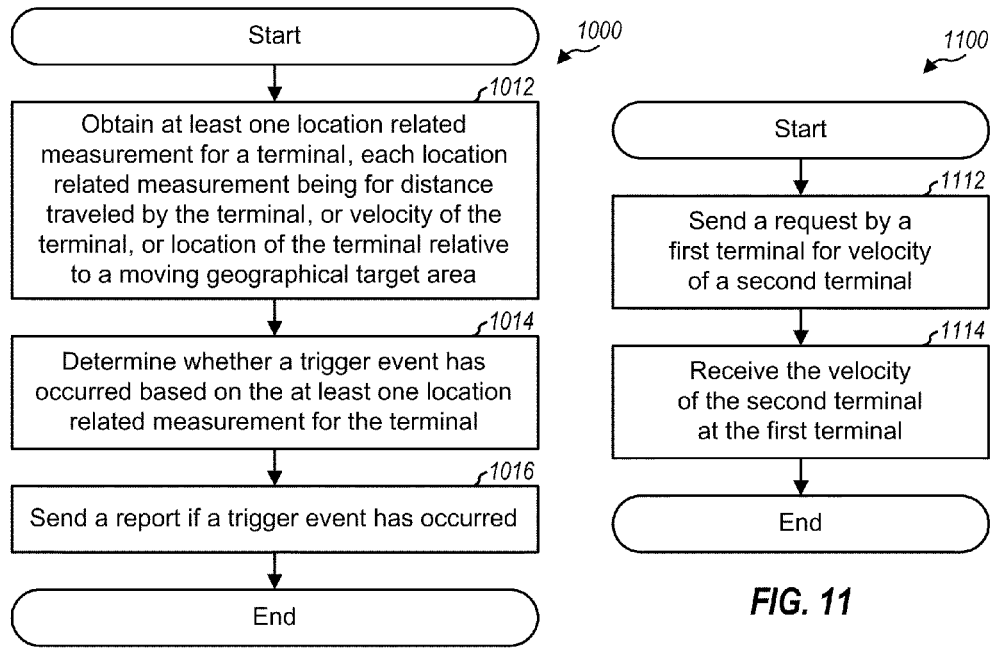
FIG. 10
FIG. 11
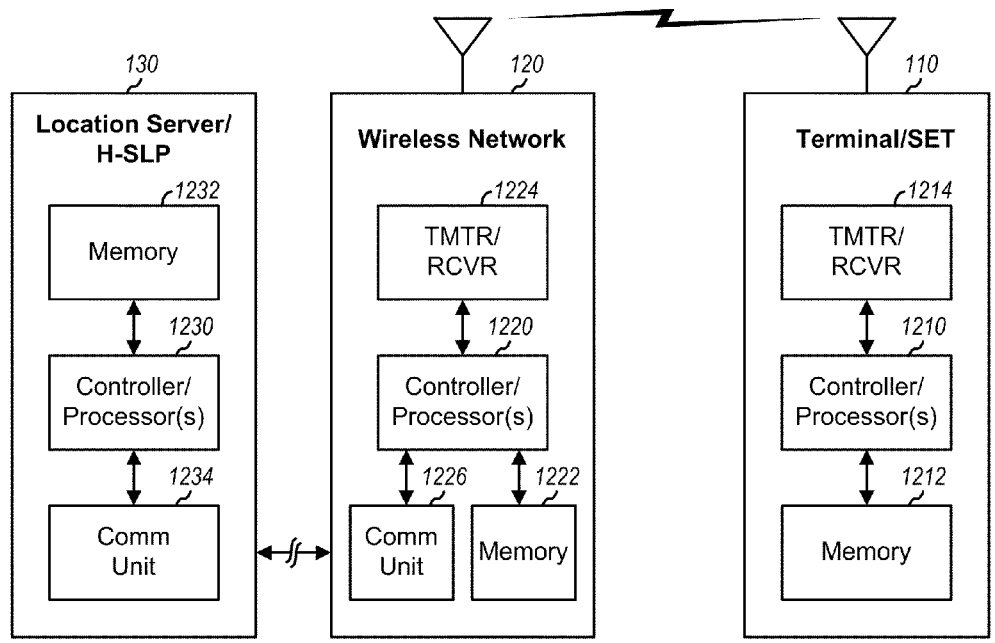
FIG. 12

TRIGGERED LOCATION SERVICES

I. CLAIM OF PRIORITY UNDER 35 U.S.C. §119

The present application for patent claims priority to Provisional U.S. Application Ser. No. 61/151,089, entitled "Triggered Location Services," filed Feb. 9, 2009, assigned to the assignee hereof, and expressly incorporated herein by reference.

BACKGROUND

I. Field

The present disclosure relates generally to communication, and more specifically to techniques for supporting location services.

II. Background

It is often desirable, and sometimes necessary, to know the location of a terminal in a wireless network. The terms "location" and "position" are synonymous and are used interchangeably herein. For example, a user may utilize the terminal to browse through a website and may click on location sensitive content. The location of the terminal may then be determined and used to provide appropriate content to the user. There are many other scenarios in which knowledge of the location of the terminal is useful or necessary.

A message flow (which may also be called a call flow or a procedure) is typically executed in order to obtain location information (e.g., a location estimate) for the terminal and to send the location information to a client entity. Various messages are typically exchanged between one or more network entities, the terminal, and the client entity for the message flow. These messages ensure that each entity is provided with pertinent information, or can obtain this information from another entity, in order to carry out positioning for the terminal and/or to deliver location information to the client entity. However, these messages add to the traffic at various network entities. The additional traffic may be especially great for location services in which location information may be periodically provided to the client entity. The messages may also extend the response time for sending the location information to the client entity.

SUMMARY

Techniques for supporting triggered location services are described herein. A triggered location service is a service in which a report with location information may be sent whenever a trigger event occurs. The trigger event may be defined in different manners for different triggered location services.

In one design of supporting a triggered location service, at least one location related measurement for a terminal may be obtained. Each location related measurement may be for the distance traveled by the terminal, or the velocity of the terminal, or the location of the terminal relative to a moving geographical target area. Whether a trigger event has occurred may be determined based on the at least one location related measurement for the terminal. A report may be sent if a trigger event has occurred.

In one design, for an equidistance triggered service, the at least one location related measurement may be for the distance traveled by the terminal, which may be determined in various manners as described below. Whether a trigger event has occurred may be determined based on the distance traveled by the terminal. For example, a trigger event may be declared if the distance traveled by the terminal exceeds a predefined distance.

In another design, for a relative terminal to terminal triggered service, the at least one location related measurement may be for the location of the terminal relative to a moving geographical target area. The moving geographical target area may be determined based on the location of a reference terminal. A trigger event may be declared if the location of the terminal matches a criterion with respect to the moving geographical target area. The criterion may be inside, outside, entering or leaving the moving geographical target area.

In yet another design, for a velocity triggered service, the at least one location related measurement may be for the velocity of the terminal. Whether a trigger event has occurred may be determined based on the velocity of the terminal. For example, the velocity of the terminal may be determined periodically, and the maximum velocity of the terminal since the last trigger event may be determined. A trigger event may be declared if the maximum velocity exceeds a predefined velocity.

In yet another design, for a time-distance-velocity (T-D-V) combination triggered service, the at least one location related measurement may be for the distance traveled by the terminal and the velocity of the terminal. Whether a trigger event has occurred may be determined based on the distance traveled by the terminal, the velocity of the terminal, and/or elapsed time since the last trigger event. For example, multiple expressions may be determined. Each expression may be for the distance traveled by the terminal relative to a predefined distance, or the maximum velocity of the terminal relative to a predefined velocity, or the elapsed time relative to a predefined time. Whether a trigger event has occurred may be determined based on a function of the multiple expressions.

In yet another design, for a terminal to terminal velocity service, a first terminal may send a request for the velocity of a second terminal, e.g., to a location center. The first terminal may thereafter receive the velocity of the second terminal either once or a plurality of times (e.g., from the location center or the second terminal) in response to the request.

Other triggered location services are described below. Various aspects and features of the disclosure are also described in further detail below.

BRIEF DESCRIPTION OF THE DRAWINGS

FIG. 10 illustrates a process for supporting triggered location services.

FIG. 11 illustrates a process for supporting the terminal to terminal velocity service.

FIG. 12 illustrates a block diagram of a terminal, a wireless network, and a location server.

DETAILED DESCRIPTION

Techniques for supporting triggered location services are described herein. These techniques may be used for terminals communicating with various wireless networks. The term "network" and "system" are often used interchangeably. For example, the techniques may be used for wireless networks defined by an organization named "3rd Generation Partnership Project" (3GPP) and wireless networks defined by an organization named "3rd Generation Partnership Project 2" (3GPP2).

The techniques may also be used for user plane and control plane location architectures/solutions. A user plane location architecture is a location architecture that sends messages for location services via a user plane. A user plane is a mechanism for carrying signaling and data for higher-layer applications and employing a user-plane bearer, which is typically implemented with standard protocols such as User Datagram Protocol (UDP), Transmission Control Protocol (TCP), and Internet Protocol (IP). A control plane location architecture is a location architecture that sends messages for location services via a control plane. A control plane is a mechanism for carrying signaling for higher-layer applications and is typically implemented with network-specific protocols, interfaces, and signaling messages. Messages supporting location services are carried as part of signaling in a control plane architecture and as part of data (from the network perspective) in a user plane architecture. The content of the messages may, however, be the same or similar in both user plane and control plane location architectures.

Figure 1:
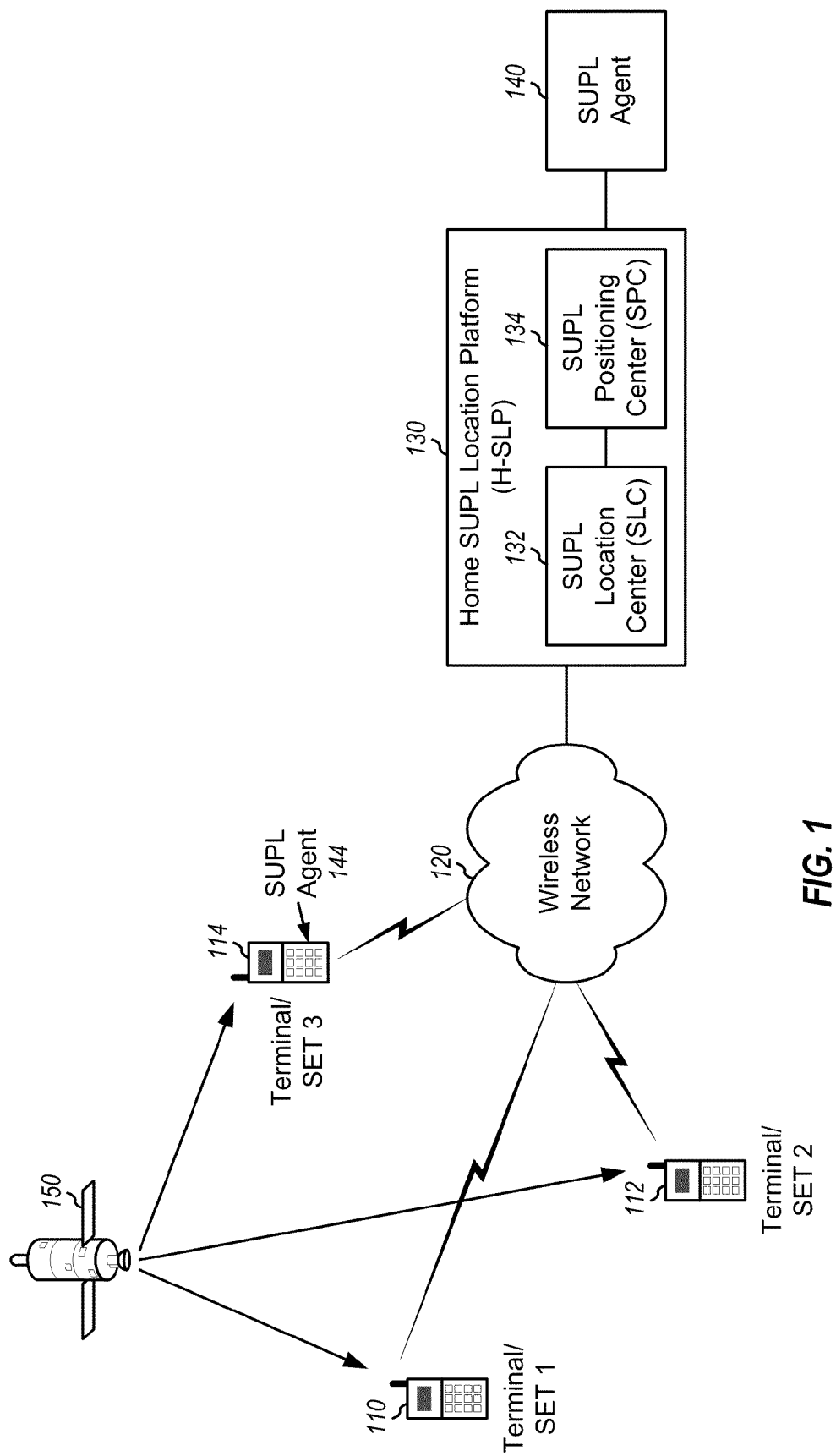
FIG. 1 illustrates an exemplary deployment supporting location services.

For clarity, certain aspects of the techniques are described below for Secure User Plane Location (SUPL) from Open Mobile Alliance (OMA). SUPL is applicable for 3GPP, 3GPP2 and WLAN networks and is described in publicly available documents from OMA. For clarity, SUPL terminology is used in much of the description below FIG. 1 shows an exemplary deployment supporting location services. Terminals 110, 112 and 114 may communicate with a wireless network 120 to obtain communication services. A terminal may be stationary or mobile and may also be referred to as a mobile station (MS), a user equipment (UE), an access terminal (AT), a subscriber station, a station, etc. A terminal may be a cellular phone, a personal digital assistant (PDA), a handheld device, a wireless device, a laptop computer, a wireless modem, a cordless phone, a telemetry device, a tracking device, etc. A terminal may be referred to as a SUPL Enabled Terminal (SET) in SUPL. The terms "terminal" and "SET" are used interchangeably herein.

Wireless network 120 may be a wireless wide area network (WWAN), a wireless metropolitan area network (WMAN), a wireless local area network (WLAN), etc. A WWAN may be a Code Division Multiple Access (CDMA) 1X network, a Wideband CDMA (WCDMA) network, Global System for Mobile Communications (GSM) network, a Long Term Evolution (LTE) network, etc. A WMAN may implement IEEE 802.16, which is commonly referred to as WiMAX. A WLAN may implement IEEE 802.11 (which is commonly referred to as Wi-Fi), HiperLAN, etc.

A SET may receive and measure signals from satellites such as a satellite 150 to obtain pseudo-range measurements for the satellites. The satellites may be part of the United States Global Positioning System (GPS), the European Galileo system, the Russian GLONASS system, or some other satellite positioning system (SPS), or a combination of these systems. The pseudo-range measurements and the known locations of the satellites may be used to derive a location estimate for the SET. A location estimate may also be referred to as a position estimate, a position fix, etc. The SET may also receive and measure signals from base stations within wireless network 120 to obtain timing and/or signal strength measurements for the base stations. The timing and/or signal strength measurements and the known locations of the base stations may be used to derive a location estimate for the SET. In general, a location estimate may be derived based on measurements for satellites, base stations, pseudolites, and/or other transmitters and using one or a combination of positioning methods.

A Home SUPL Location Platform (H-SLP) 130 may communicate with SETs to support location services for the SETs. Location services may include any services based on or related to location information. Location services may include positioning, which is a process to determine a geographic or civil location estimate for a SET. Positioning may provide (i) latitude, longitude, and possibly altitude coordinates and an uncertainty for a geographic location estimate or (ii) a street address for a civil location estimate. Positioning may also provide velocity and/or other information. H-SLP 130 may include a SUPL Location Center (SLC) 132 and a SUPL Positioning Center (SPC) 134. SLC 132 may support location services, coordinate the operation of SUPL, and interact with SETs over user plane bearer. SLC 132 may perform functions for privacy, initiation, security, roaming support, charging/billing, service management, location calculation, etc. SPC 134 may support positioning for SETs and delivery of assistance data to the SETs and may also be responsible for messages and procedures used for location calculation. SPC 134 may perform functions for security, assistance data delivery, reference retrieval, location calculation, etc.

A SUPL agent 140 may be a location client and may communicate (e.g., directly or via one or more networks) with H-SLP 130 to obtain location information for target SETs. A target SET is a SET for which location information is sought by a SUPL agent. Location information may comprise a location estimate and/or any information related to location or velocity. A SET may also have a SUPL agent resident within the SET. For example, SET 114 has a SUPL agent 144 within the SET.

A SET may be capable of position determination and may be able to determine its location with or without assistance from a network. For a SET-based mode, the location of the SET may be determined by the SET, possibly with assistance data from an SPC. For a SET-assisted mode, the location of the SET may be determined by the SPC with assistance (e.g., measurements) from the SET. The SET may support one or more positioning methods such as autonomous GPS, assisted GPS (A-GPS), advanced forward link trilateration (A-FLT), enhanced observed time difference (EOTD), observed time difference of arrival (OTDOA), hybrid, etc. For simplicity, the term "GPS" can refer to any SPS such as GPS, Galileo, GLONASS, etc. The autonomous GPS and A-GPS methods can provide a location estimate for the SET-based solely on satellite measurements and have high accuracy. The hybrid method can provide a location estimate based on both satellite and base station measurements and has high accuracy and high reliability. The A-FLT, EOTD, and OTDOA methods can provide a location estimate based on timing measurements of base stations made by the SET and have good accuracy. The SET may also support other positioning methods.

In an aspect, various triggered location services may be supported. A triggered location service may provide a SUPL agent with location information for a target SET whenever a trigger event occurs. Different triggered location services may be associated with different types of trigger. Table 1 lists some triggered location services and provides a short description of each triggered location service. Other triggered location services may also be supported based on other types of trigger. The triggered location services in Table 1 are described in further detail below.

TABLE 1

| Triggered Location Service | Description |
| --- | --- |
| Equidistance Triggered Service | Periodically determine location of a target SET and report when the target SET has moved a predefined distance. |
| Relative SET to SET Triggered Service | Periodically determine location of a target SET and a reference SET and report when the target SET is inside, or is outside, or enters, or leaves a geographical target area centered at the reference SET. |
| Velocity Triggered Service | Periodically determine velocity of a target SET and report when the velocity reaches a predefined level. |
| T-D-V Combination Triggered Service | Periodically determine location and/or velocity of a target SET and report based on trigger criteria defined by elapsed time (T), distance traveled (D), and/or velocity (V). |

The equidistance triggered service may periodically determine the location of a target SET and report location information when the target SET has moved a predefined distance. Distance may refer to (i) a straight line distance between the current location of the SET and its initial location when distance monitoring began, or (ii) an overall distance of a typically non-linear path traced out by the SET since leaving its initial location, or (iii) distance defined in some other way. A SUPL agent may initiate the equidistance triggered service, identify the target SET, and provide applicable parameters.

The equidistant triggered service may be used to periodically monitor a mobile terminal (e.g., SET 110) and to send a notification to a third party (e.g., SUPL agent 140) whenever the terminal has traveled a predefined distance. For example, an operations center of a trucking company may want to know the location of the trucks in its fleet after every 10 miles traveled. The third party (e.g., the operations center) may send a location request to a location server (e.g., H-SLP 130). The location server in collaboration with the terminal (which may be position determination capable) may start a position determination procedure that may allow for detection of whether the terminal has moved by the predefined distance. Whenever this event occurs, the location server may notify the location client.

Figure 2:
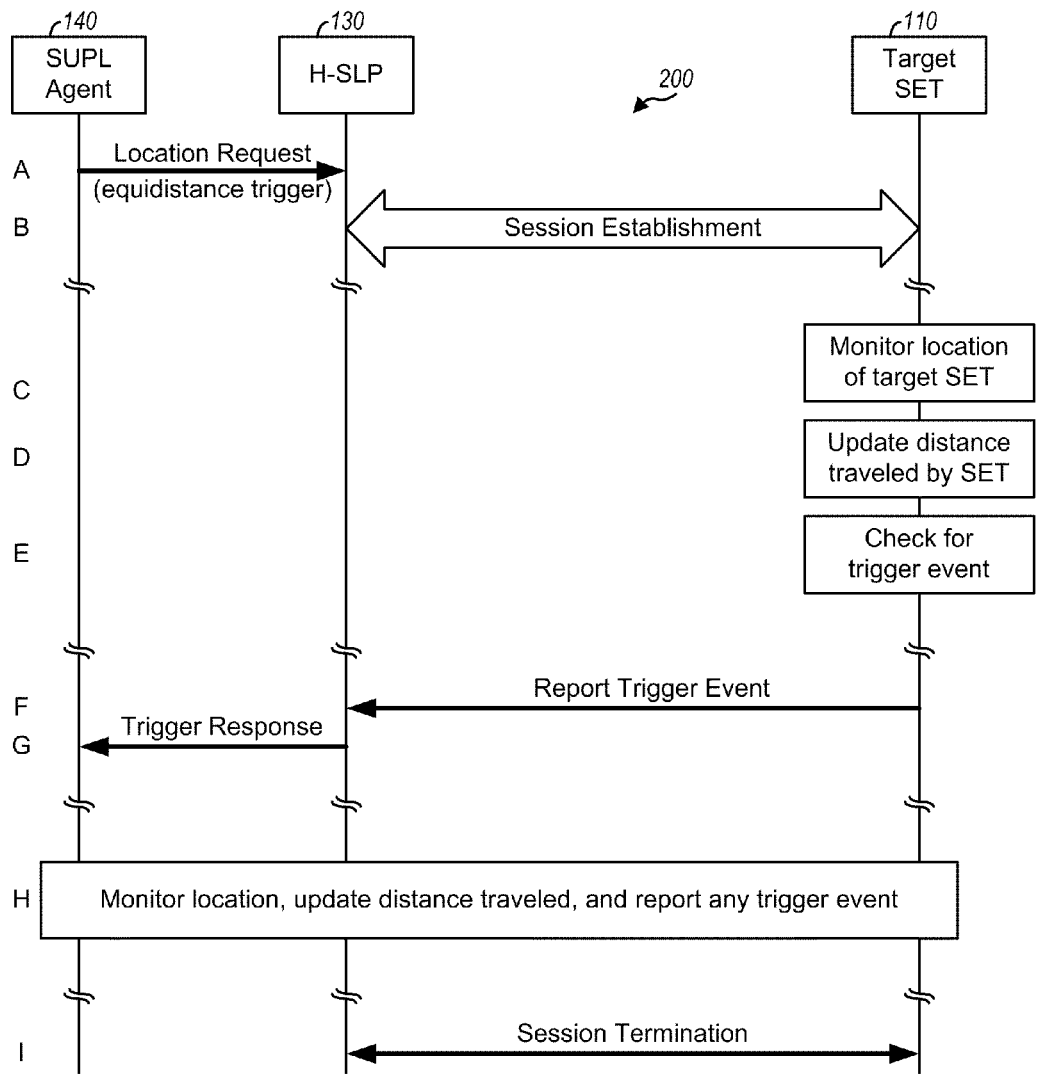
FIGS. 2 and 3 illustrate two message flows for the equidistance triggered service.

FIG. 2 shows a design of a message flow 200 for equidistance triggered service. SUPL agent 140 may desire to know whenever target SET 110 has moved a predefined distance from the last reported location and may send a location request with an indication of equidistance trigger to H-SLP 130 (step A). H-SLP 130 may then communicate with target SET 110 to establish an equidistance triggered session (step B).

The location of SET 110 may be determined periodically using the SET-based mode or the SET-assisted mode. For the SET-based mode, SET 110 may autonomously make measurements and determine its location. SET 110 may communicate with H-SLP 130 to obtain assistance data whenever necessary. For the SET-assisted mode, SET 110 may engage in a positioning session with H-SLP 130, and H-SLP 130 may calculate a location estimate based on measurements from SET 110. In general, the location of SET 110 may be determined solely by SET 110, by SET 110 with assistance from H-SLP 130, by H-SLP 130 with assistance from SET 110, etc. Furthermore, the evaluation of the trigger condition may be performed by either SET 110 or by H-SLP 130.

The location of SET 110 may be determined at the start of the equidistance triggered session and used as an initial location. The location of SET 110 may also be determined periodically during the equidistance triggered session. In one design, the location of SET 110 may be determined every X seconds, where X may be any suitable value and may be specified by a trigger parameter. In another design, the location of SET 110 may be determined as often as possible. In yet another design, the location of SET 110 may be determined at times ascertained based on the estimated velocity of SET 110 and the predefined distance. The location of SET 110 may thus be determined at shorter intervals for higher velocity and/or shorter predefined distance, and vice versa. In yet another design, the location of SET 110 may be determined based on a sensor that can detect motion of SET 110. For example, the location of SET 110 may be determined while it is mobile and may be paused while it is stationary. The location of SET 110 may also be determined relative to a previous location using sensors, e.g., a sensor to detect and obtain linear acceleration, a sensor to detect and obtain change of direction, etc. The location of SET 110 may also be determined periodically in other manners.

The location of SET 110 may be determined (step C) and the distance traveled by SET 110 may be updated (step D). The traveled distance may be determined in various manners. In one design, the traveled distance may be a total distance obtained by accumulating incremental distances between successive locations for SET 110 since the last report. In this design, SET 110 may (i) determine the incremental distance between its current location and the last location and (ii) sum this incremental distance with the accumulated distance for the last location to obtain the accumulated distance for the current location. In another design, the traveled distance may be the distance between the current location and the location of the last report, which may be the initial location if no report has been sent. In yet another design, the traveled distance may be the distance along a particular route, e.g., along a trajectory from the initial location to a destination location or along a more complex route. The traveled distance may also be determined in other manners.

In one design, SET 110 may check for trigger events and initiate reporting. In another design, H-SLP 130 may check for trigger events and initiate reporting. In general, any suitable entity may be designated to perform the check and to initiate reporting. The designated entity may be provided with the location of SET 110, the trigger parameters, and/or other pertinent information. For clarity, much of the description below assumes that SET 110 is the designated entity.

SET 110 may check whether a trigger event has occurred based on the distance traveled by SET 110 and the predefined distance (step E). A trigger event may occur if the traveled distance exceeds the predefined distance. In this case, SET 110 may report to H-SLP 130 that a trigger event has occurred (step F). The report may also include the current location of SET 110, the distance traveled by SET 110, and/or other information. H-SLP 130 may then send a trigger response to inform SUPL agent 140 that a trigger event has occurred (step G). The response may include some or all of the information provided in the trigger report from SET 110. If a trigger event has not occurred, then steps F and G may be skipped.

Steps C through G may be for one processing cycle. Additional processing cycles may be performed in similar manner (step H). Each processing cycle may include steps to determine the current location of SET 110, determine the distance traveled by SET 110, and determine whether a trigger event has occurred. Trigger event reporting by SET 110 and trigger response by H-SLP 130 may be initiated if a trigger event has occurred and may be skipped otherwise. The end of the equidistant triggered session may be reached, e.g., when a stop time is reached, when a predefined final waypoint is reached, etc. Upon reaching the end of the equidistant triggered session, H-SLP 130 and SET 110 may terminate the session (step I).

Figure 3:
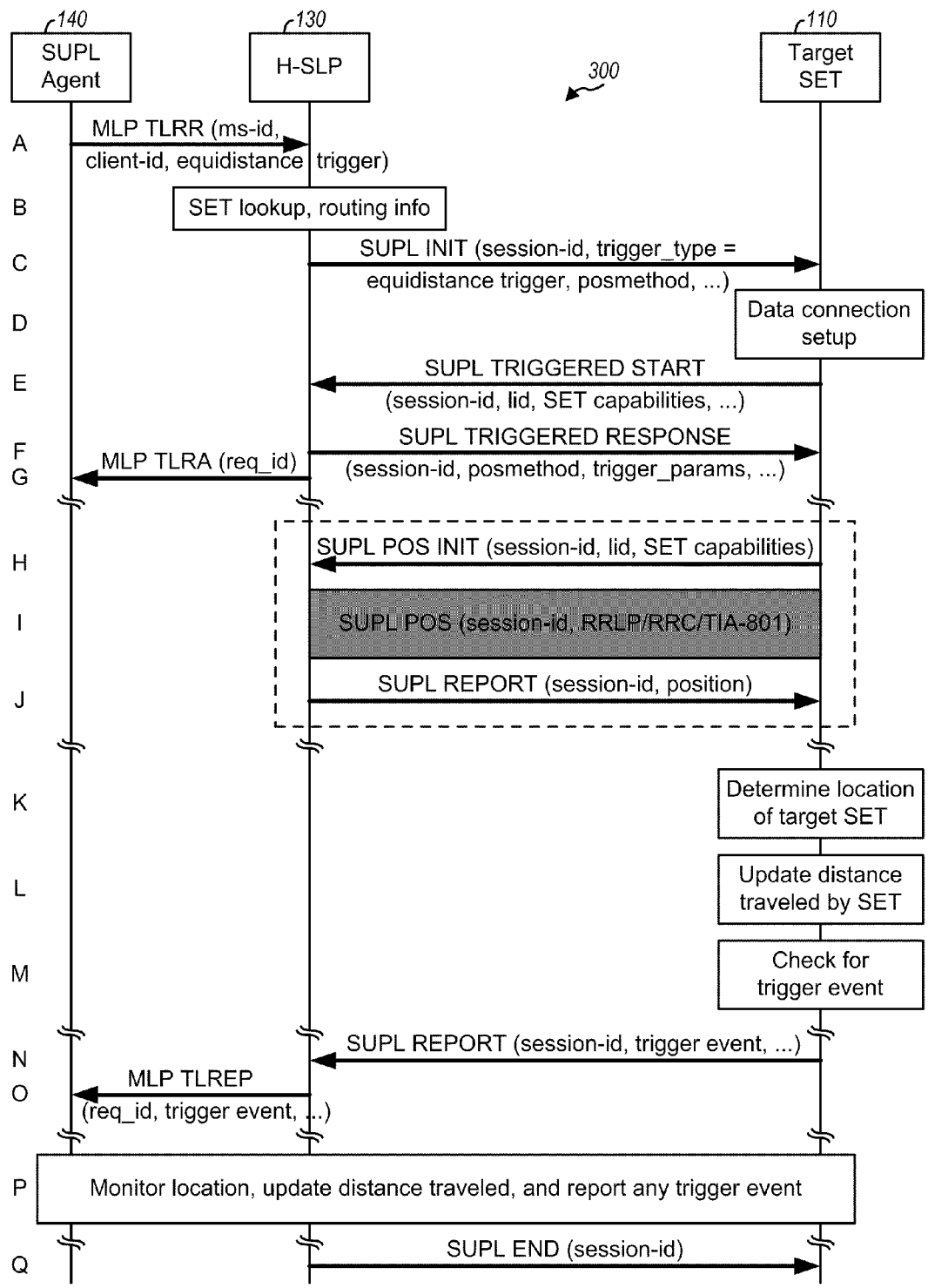

FIG. 3 shows a design of a message flow 300 for equidistance triggered service using SUPL messages. SUPL agent 140 may desire to know whenever SET 110 has moved a particular distance from the last reported location of SET 110. SUPL agent 140 may send a Mobile Location Protocol Triggered Location Response Request (MLP TLRR) message to H-SLP 130, which may be an H-SLP with which SUPL agent 140 is associated (step A). The MLP TLRR message may include a client identifier (ID) for SUPL agent 140 (client-id), a mobile station identity (ms-id) for target SET 110, an indication of equidistance triggered service being requested, trigger parameters (e.g., a predefined distance, start time, stop time, etc.), etc. The trigger parameters may be used to determine trigger events for reporting by target SET 110.

H-SLP 130 may authenticate SUPL agent 140 and check if the SUPL agent is authorized for the requested location service based on the client ID. H-SLP 130 may also apply subscriber privacy against SUPL agent 140 based on the mobile station ID. For the privacy check, H-SLP 130 may verify if SUPL agent 140 or this type of SUPL agent is allowed to request location information for SET 110 and whether SET 110 may need to be notified of this request and allowed to accept or reject the request. H-SLP 130 may invoke the equidistant triggered service only with the consent of the user of SET 110 in order to ensure privacy. The equidistant triggered service may also dynamically take into account modifications of the privacy settings of the SET user.

H-SLP 130 may then look up SET 110, verify that SET 110 is currently not roaming, and also verify that SET 110 supports SUPL (step B). H-SLP 130 may obtain routing information for SET 110 and use the routing information to send messages to SET 110 (also step B). H-SLP 130 may send a SUPL INIT message to SET 110 to initiate a SUPL/location session for the equidistance triggered service (step C). The SUPL INIT message may include a session ID (session-id), an equidistance triggered service indicator, a proposed positioning method (posmethod), and/or other information. The session ID may be used to identify the SUPL session.

SET 110 may receive the SUPL INIT message from H-SLP 130 and may either attach itself to a data network if SET 110 is not already attached or establish a data connection (step D). SET 110 may evaluate notification rules and follow appropriate actions. SET 110 may then send a SUPL TRIGGERED START message to start the equidistance triggered session with H-SLP 130. This message may include the session ID, the capabilities of SET 110, etc. The SET capabilities may include the positioning methods supported by SET 110, the positioning protocols supported by SET 110 (e.g., Radio Resource LCS Protocol (RRLP) in 3GPP, Radio Resource Control (RRC) in 3GPP, LTE Positioning Protocol (LPP), TIA-801, etc.), and/or other information.

H-SLP 130 may receive the SUPL TRIGGERED START message and may select a positioning method to use for the equidistance triggered session by considering the SET capabilities included in the received message. H-SLP 130 may then send to SET 110 a SUPL TRIGGERED RESPONSE message that may include the session ID, the selected positioning method (posmethod), the trigger parameters, etc. (step F). SET 110 and H-SLP 130 may release the secure IP connection after step F. H-SLP 130 may send an MLP Triggered Location Reporting Answer (TLRA) message to inform SUPL agent 140 that the equidistance triggered service has been accepted (step G).

Steps A through G are setup steps for the equidistance triggered session. Location information for SET 110 may thereafter be reported in accordance with the trigger parameters provided by SUPL agent 140 in step A and sent to SET 110 in step F.

SET 110 may engage in a positioning session with H-SLP 130 to obtain assistance data in the SET-based mode or to determine the location of SET 110 in the SET-assisted mode. SET 110 may send a SUPL POS INIT message to initiate the positioning session with H-SLP 130 (step H). This message may include the session ID, a location ID (lid), the SET capabilities, a request for assistance data, and/or other information. H-SLP 130 may then engage with SET 110 in a SUPL POS session (or positioning session) (step I). H-SLP 130 and SET 110 may exchange messages for a selected positioning protocol (e.g., RRLP, RRC, LPP, or TIA-801) to provide assistance data to SET 110 and/or to calculate a location estimate for SET 110. H-SLP 130 may send the location estimate and/or other information in a SUPL REPORT message to SET 110 (step J).

The location of SET 110 may be determined by SET 110 alone or with assistance of H-SLP 130 via steps H, I and J (step K). The distance traveled by SET 110 may be updated, e.g., using any of the schemes described above for computing traveled distance (step L). SET 110 may compare the traveled distance against the predefined distance and determine whether it has moved by the predefined distance (step M). If SET 110 has moved by the predefined distance and a trigger event has occurred, then SET 110 may send a SUPL REPORT message to H-SLP 130 (step N). This message may include an indication that a trigger event has occurred and may also include the current location of SET 110, the distance traveled by SET 110, and/or other information. In response to a trigger event, H-SLP 130 may send an MLP Triggered Location Report (TLREP) message to SUPL agent 140 (step O). This message may include the request ID, an indication that a trigger event has occurred, the current location of SET 110, the distance traveled by SET 110, the date and time for the current location, the positioning method used to determine the current location, and/or other information. Steps N and O may be skipped if a trigger event has not occurred.

Steps K through O are for one processing cycle. Additional processing cycles may be performed in similar manner (step P). Each processing cycle may include steps to determine the current location of SET 110, determine the distance traveled by SET 110, and determine whether a trigger event has occurred. Reporting may be initiated if a trigger event has occurred and may be skipped otherwise. The end of the equidistant triggered session may be reached, e.g., when the stop time is reached, when a predefined final waypoint is reached, etc. Upon reaching the end of the equidistant triggered session, H-SLP 130 and SET 110 may terminate the session. H-SLP 130 may send a SUPL END message to SET 110 (step Q), or SET 110 may send a SUPL END message to H-SLP 130 (not shown in FIG. 3). H-SLP 130 may also notify SUPL agent 140 of the session end. Alternatively, each entity may autonomously determine the end of the session and terminate the session without exchanging any signaling.

The relative SET to SET triggered service may periodically determine the location of a target SET and the location of a reference SET and may report location information when the target SET has entered or left a moving geographical target area centered at the reference SET location. A SUPL agent may initiate the relative SET to SET triggered service, identify the target and reference SETs, and provide applicable parameters.

Figure 4:
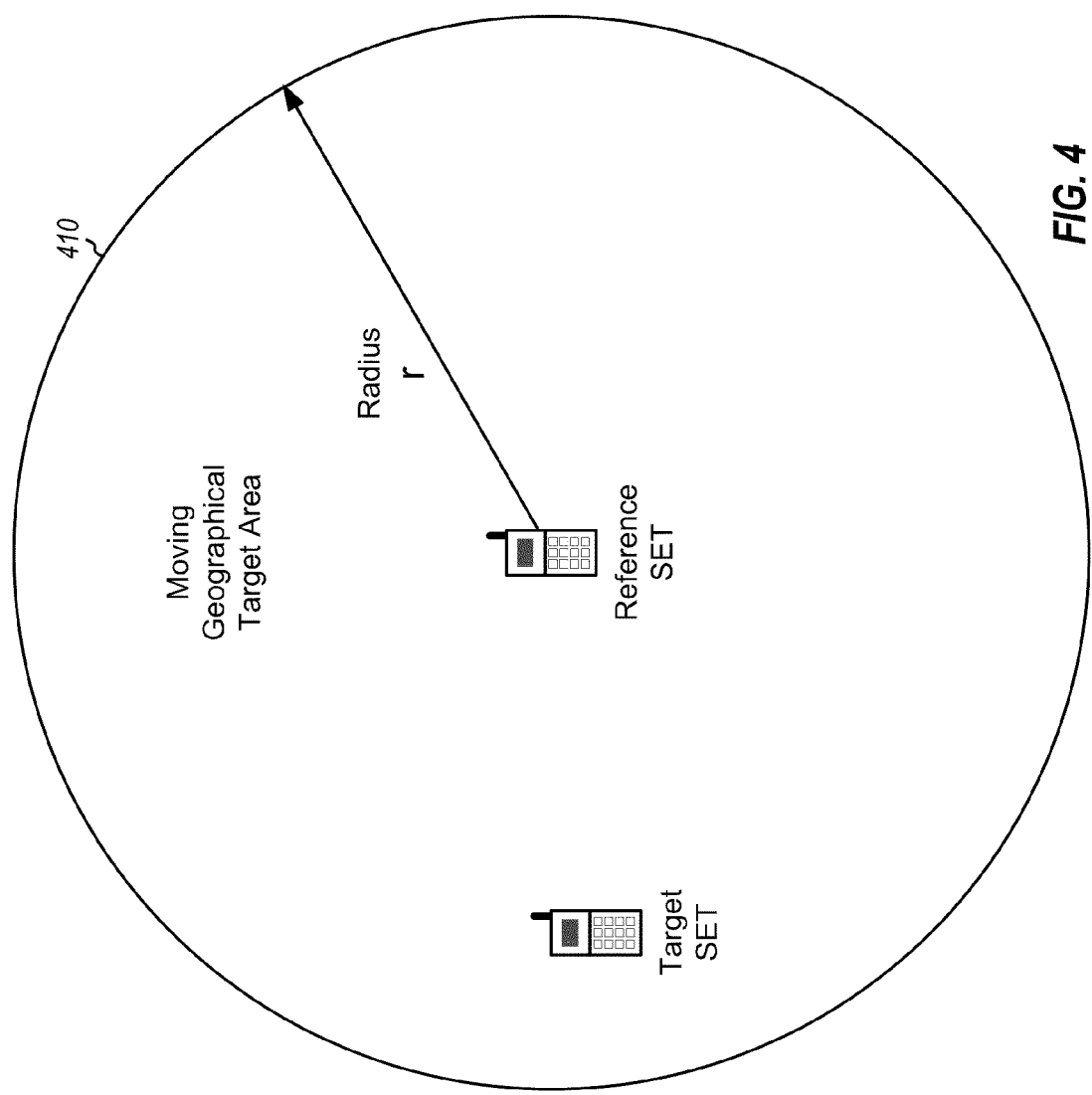
FIG. 4 illustrates a moving geographical target area.

FIG. 4 shows a geographical target area 410 for the relative SET to SET triggered service. The geographical target area may be centered at the location of the reference SET and may be a circular area defined by a radius of r from the reference SET location. The geographical target area may move in sync with the location of the reference SET. In general, the geographical target area may be defined with any shape, e.g., with a more complex polygon. The geographical target area may also be (i) two dimensional and defined by horizontal location or (ii) three dimensional and defined by both horizontal location and altitude.

For example, a mother and a child may be in a shopping mall. The mother may want to be notified whenever the child moves outside a 30 yard radius area around her, which may be referred to as a "lost child" scenario. The mother may carry a reference terminal, and the child may carry a target terminal. A geographical target area may be defined as a circular area with radius r centered at the mother's location. The geographical target area may follow the mother's movement, i.e., moves around with the mother. Whenever the child (or the target terminal) leaves the geographical target area around the mother (e.g., when the child moves more than 30 yards away from the mother), the SUPL agent may be notified. The SUPL agent may then notify the mother that the child has left the geographical target area, e.g., is lost. This example may also be supported when the roles of the terminals are reversed, with the mother carrying the target terminal and the child carrying the reference terminal.

Figure 5:
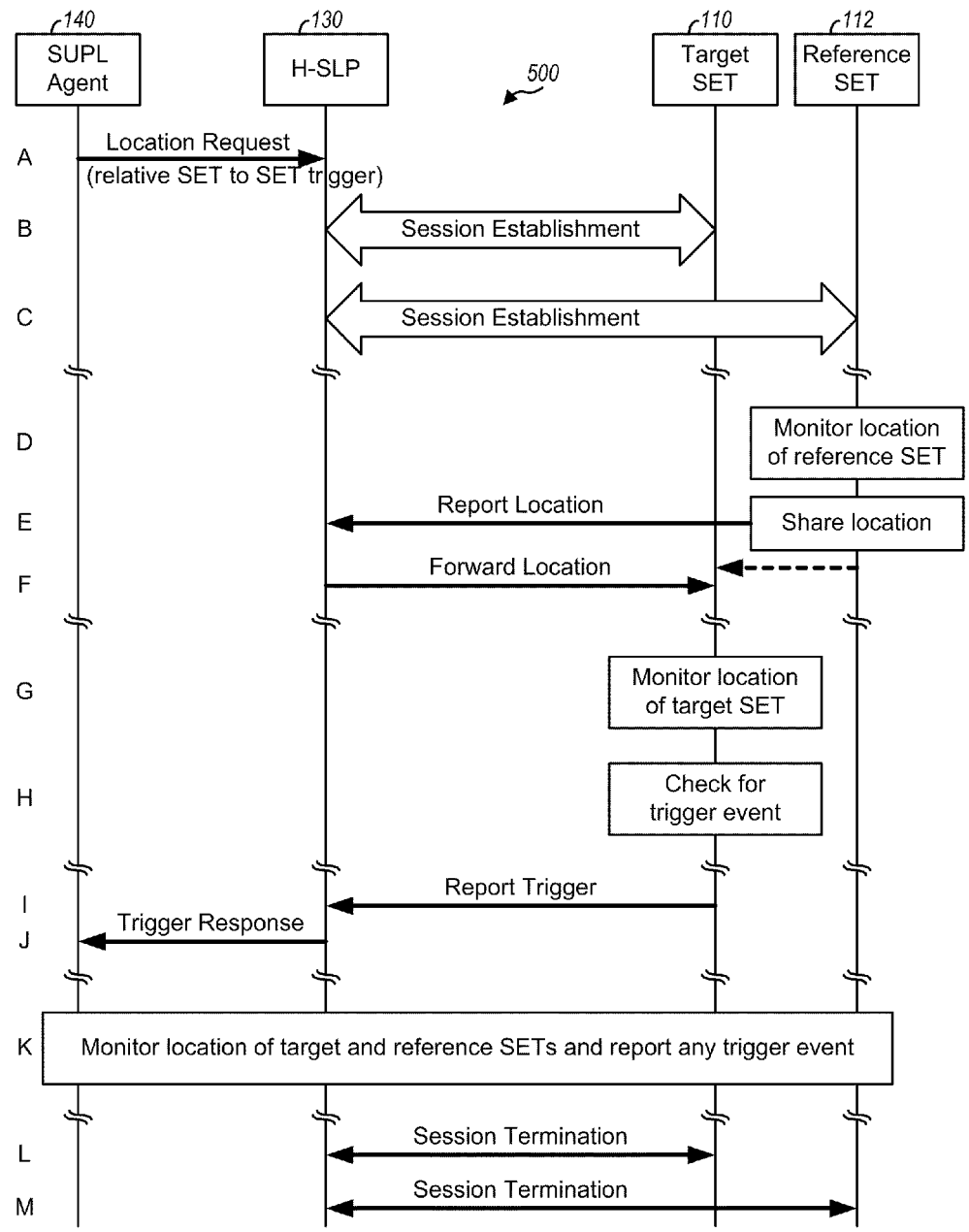
FIGS. 5 and 6 illustrate two message flows for the relative terminal to terminal triggered service.

FIG. 5 shows a design of a message flow 500 for relative SET to SET triggered service. SUPL agent 140 may desire to know the location of target SET 110 relative to a moving geographical target area defined by the location of reference SET 112 and may send a location request with an indication of relative SET to SET trigger to H-SLP 130 (step A). H-SLP 130 may then communicate with target UE 110 and reference SET 112 to establish a relative SET to SET triggered session (steps B and C).

In one design, target SET 110 may check for trigger events and initiate reporting. In another design, H-SLP 130 may check for trigger events and initiate reporting. In general, any entity may be designated to perform the check and to initiate reporting. The designated entity may be provided with the location of SETs 110 and 112, the trigger parameters, and/or other pertinent information. For clarity, much of the description below assumes that target SET 110 is the designated entity.

The location of reference SET 112 may be determined, e.g., with the SET-based mode or the SET-assisted mode (step D). The location of reference SET 112 may be provided to H-SLP 130 (step E), which may forward the location to target SET 110 (step F). Alternatively, the location of reference SET 112 may be provided directly by reference SET 112 to target SET 110, without going through H-SLP 130 (as shown by a dashed line in FIG. 5).

The location of target SET 110 may also be determined, e.g., with the SET-based mode or the SET-assisted mode (step G). Target SET 110 may check whether a trigger event has occurred based on the locations of SETs 110 and 112 and the trigger parameters defining the geographical target area (step H). A trigger event may occur if target SET 110 is or has moved inside or outside of the geographical target area. In this case, target SET 110 may report to H-SLP 130 that a trigger event has occurred (step I). The report may include the current location of target SET 110, the current location of reference SET 112, the location of target SET 110 relative to reference SET 112 (e.g., 50 meters east), and/or other information. H-SLP 130 may then send a trigger response to inform SUPL agent 140 that a trigger event has occurred (step J). The response may include some or all of the information provided in the trigger report from SET 110. If a trigger event has not occurred, then steps I and J may be skipped.

Steps D through J may be for one processing cycle. Additional processing cycles may be performed in similar manner (step K). Each processing cycle may include steps to determine the current location of reference SET 112, determine the current location of target SET 110, and determine whether a trigger event has occurred. The location of reference SET 112 may be determined at the same or different rate as the location of target SET 110. Trigger event reporting by target SET 110 and trigger response by H-SLP 130 may be initiated if a trigger event has occurred and may be skipped otherwise. The end of the relative SET to SET triggered session may be reached, e.g., when a stop time is reached, etc. Upon reaching the end of the session, H-SLP 130 and SETs 110 and 112 may terminate the session (steps L and M).

In another design, instead of obtaining the locations of the reference and target SETs in steps D and G in FIG. 5, either SET may determine its location relative to the other SET periodically in these steps. For example, in step G, target SET 110 may send a signal (e.g., a radio signal or an infrared signal) directly to reference SET 112, which may return a response signal back to SET 110. SET 110 may measure the overall response time and subtract the internal delay at SET 112, which SET 112 may include in its response signal to SET 110, or SET 110 may determine by other means. SET 110 may obtain the round trip signal propagation delay and hence the distance between itself and SET 112. This distance may then be used to evaluate the trigger condition. In yet another design, the initial locations of both SETs 110 and 112 may be obtained in steps D and G, and subsequent locations may be obtained using the location of each SET relative to these initial locations. Relative locations may also be obtained using sensors in each SET, which may require less signaling and processing resources to obtain and may be obtained at short intervals.

Figure 6:
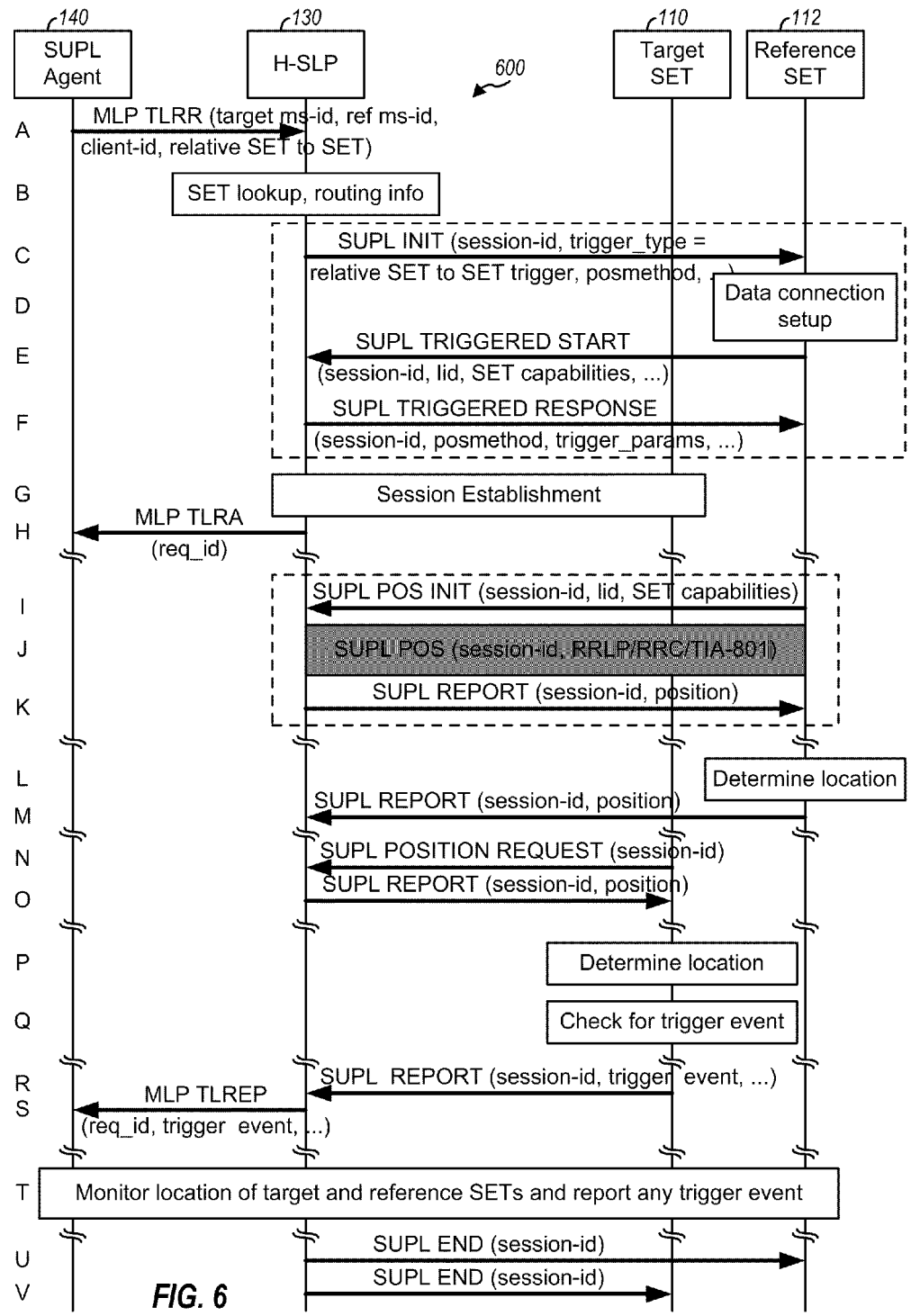

FIG. 6 shows a design of a message flow 600 for relative SET to SET triggered service using SUPL messages. SUPL agent 140 may desire to know the location of target SET 110 relative to a moving geographical target area defined by the location of reference SET 112 and may send an MLP TLRR message to H-SLP 130 (step A). The MLP TLRR message may include the SUPL agent identity (client-id), the target SET identity (target ms-id), the reference SET identity (ref ms-id), an indication of relative SET to SET triggered service being requested, trigger parameters, etc. The trigger parameters may include information regarding the geographical target area around the reference SET (e.g., radius r), trigger event information (e.g., inside, outside, entering, or leaving the target area), session duration (e.g., start time, stop time, etc.), and/or other information that may be used to determine trigger events for reporting.

H-SLP 130 may authenticate and authorize SUPL agent 140 for the relative SET to SET triggered service. H-SLP 130 may also perform notification and/or verification with SETs 110 and 112. For example, H-SLP 130 may obtain approval from the user of reference SET 112 to allow the location of reference SET 112 to be determined and possibly shared with target SET 110, H-SLP 130, and/or SUPL agent 140. H-SLP 130 may also obtain approval from the user of target SET 110 to allow the location of target SET 110 to be determined and possibly shared with reference SET 112, H-SLP 130, and/or SUPL agent 140. The relative SET to SET triggered service may also dynamically take into account modifications of the privacy settings of each SET user.

H-SLP 130 may look up SETs 110 and 112 and obtain routing information for these SETs (step B). H-SLP 130 may send a SUPL INIT message to reference SET 112 to initiate a SUPL session for the relative SET to SET triggered service (step C). SET 112 may receive the SUPL INIT message and may attach itself or establish a data connection (step D). SET 112 may evaluate notification rules and follow appropriate actions. SET 112 may then send a SUPL TRIGGERED START message to start the relative SET to SET triggered session with H-SLP 130 (step E). H-SLP 130 may receive the SUPL TRIGGERED START message from SET 112 and may select a positioning method to use for SET 112. H-SLP 130 may then send to SET 112 a SUPL TRIGGERED RESPONSE message that may include the session ID, the selected positioning method, the trigger parameters, etc. (step F). H-SLP 130 may similarly perform steps C through F for target SET 110 (step G). H-SLP 130 may send an MLP TLRA message to inform SUPL agent 140 that the relative SET to SET triggered service has been accepted (step H).

H-SLP 130, target SET 110, and reference SET 112 may thereafter collaborate to detect for occurrence of a trigger event. The location of each SET may be determined periodically (e.g., every X seconds) during the session. In one design, a SET may autonomously make measurements and determine its location. In another design, a SET may engage in a positioning session with H-SLP 130 to determine its location. In general, the location of each SET may be determined solely by that SET, by the SET with assistance from H-SLP 130, by H-SLP 130 with assistance from the SET, etc. Reference SET 112 may perform steps I, J and K, as necessary, to obtain assistance data from H-SLP 130 or to determine its location for the SET-assisted mode. Similarly, target SET 110 may perform steps I, J and K, as necessary, to obtain assistance data from H-SLP 130 or to determine its location for the SET-assisted mode. Steps I, J and K may be performed as described above for steps H, I and J, respectively, in FIG. 3.

In one design, target SET 110 may check for a trigger event and initiate reporting. In another design, H-SLP 130 may check for a trigger event and initiate reporting. In yet another design, reference SET 112 may check for a trigger event and initiate reporting. In general, any entity or any combination of entities may be designated to perform the check and initiate reporting. The designated entity or entities may be provided with the current locations of SETs 110 and 112 and the trigger parameters. For clarity, the description below assumes that target SET 110 checks for a trigger event and initiates reporting.

Reference SET 112 may determine its location (step L) and may send a SUPL REPORT message with its current location to H-SLP 130 (step M). For a pull mechanism, target SET 110 may send a SUPL POSITION REQUEST message to H-SLP 130 to request for the current location of reference SET (step N). In response, H-SLP 130 may forward the current location of reference SET 112 in a SUPL REPORT message to target SET 110 (step O). The pull mechanism may allow target SET 110 to request for location information at its convenience, e.g., when target SET 110 has an open connection. For a push mechanism, H-SLP 130 may forward the location of reference SET 112 whenever it is received from SET 112. In this case, step O would occur but step N may be skipped. The push mechanism may allow H-SLP 130 to provide the reference SET location whenever it is available, without the need for target SET 110 periodically request for it. Reference SET 112 may also send its current location directly to target SET 110, without interacting with H-SLP 130.

Target SET 110 may determine its location (step P). Target SET 110 may compare its current location against the current location of reference SET 112 and may determine whether it is within or outside or has moved into or out of the geographical target area defined by the current location of reference SET 112 (step Q). If a trigger event has occurred, then target SET 110 may send a SUPL REPORT message with an indication of an event trigger and possibly its current location and/or the location of reference SET 112 to H-SLP 130 (step R). H-SLP 130 may then send to SUPL agent 140 an MLP TLREP message that may include the request ID, an event trigger indication, and possibly other information such as the location of target SET 110, the location of reference SET 112, the date and time for each location, the positioning method used to determine each location, and/or other information (step S). Target SET 110 may be informed of a trigger event relative to the location of reference SET 112, e.g., triggered by target SET 110. Reference SET 112 may also be informed of a triggered event relative to its own position, e.g., triggered by target SET 110.

Steps L through S are for one processing cycle. Additional processing cycles may be performed in similar manner (step T). Each processing cycle may include steps to determine the current location of each SET and to determine whether a trigger event has occurred. Reporting may be initiated (e.g., in steps R and S) if a trigger event has occurred and may be skipped otherwise. The end of the relative SET to SET triggered session may be reached, e.g., when the stop time is reached, etc. Upon reaching the end of the session, H-SLP 130, target SET 110, and reference SET 112 may terminate the session. H-SLP 130 may send a SUPL END message to each SET (steps U and V). A SET may also send a SUPL END message. H-SLP 130 may also notify SUPL agent 140 of the session end.

The relative SET to SET triggered service may be used to periodically monitor the movement of a target terminal in relation to a geographical target area with a reference terminal as its center. The geographical target area may be defined relative to the reference terminal (and not the target terminal, as is the case for other triggered services) and may move in sync with the reference terminal. A notification may be sent to a third party (e.g., SUPL agent 140) whenever the target terminal is within or outside, enters or leaves the geographical target area. The third party may send a location request to a location server (e.g., H-SLP 130). The location server may start a position determination procedure with both the target and reference terminals. The location of the reference terminal may be periodically determined and compared with the location of the target terminal to enable detection of the target terminal being inside or outside, entering or leaving of the geographical target area around the reference terminal. Whenever this trigger event is detected, the location server may notify the location client and possibly the target terminal and/or the reference terminal.

The velocity triggered service may periodically determine whether the velocity of a target SET has reached a predefined velocity (i.e., a velocity level) and may report the velocity when a trigger event is detected. A SUPL agent may initiate the velocity triggered service, identify the target SET, and provide applicable parameters.

Velocity may include speed and/or bearing. Speed may indicate how fast a SET is moving, and bearing may indicate which direction the SET is moving. In general, a trigger criterion may be defined based on only speed, or only bearing, or both speed and bearing. For example, a trigger criterion may be defined to send a report (i) when a truck reaches a speed of 70 mph, or (ii) when the truck is heading north, or (iii) when the truck is heading north at more than 70 mph. A trigger criterion may also be defined for increasing and/or decreasing speed. For example, a report may be sent when the truck reaches 70 mph (starting from a stop light). The truck may accelerate further and reach 90 mph. Another report may be sent when the truck slows down to 70 mph. Alternatively, another report may be sent if the truck slows down below a lower level (e.g., 65 mph) and then exceeds 70 mph. In general, velocity used for the velocity triggered service may refer to only speed, or only bearing, or both speed and bearing. Various trigger criteria may also be used for the velocity triggered service.

A velocity trigger may be defined in various manners. In one design, a velocity trigger may occur when the velocity of the target SET first drops below a lower level and thereafter meets or exceeds a predefined velocity. The lower level may be defined based on the predefined velocity, e.g., may be a certain margin below the predefined velocity. For example, a truck may start at a traffic light and thereafter reach a predefined velocity of 70 mph, which may be defined based on a speed limit of 65 mph plus a 5 mph margin. A velocity trigger may occur when the truck first reaches 70 mph, and no velocity trigger may occur as long as the truck keeps speeding above the lower level. The lower level may be 60 mph, which may be defined based on the 65 mph speed limit minus a 5 mph margin. Another velocity trigger may occur if the truck slows down below the lower level of 60 mph and then meets or exceeds the predefined velocity of 70 mph. In another design, a velocity trigger may occur if the velocity of the target SET exceeds the predefined velocity, but may be limited to at most one velocity trigger in each predefined time interval. For the example above, a velocity trigger may occur every predefined time interval of 5 minutes in which the truck meets or exceeds the predefined velocity. A velocity trigger may also be defined in other manners.

Figure 7:
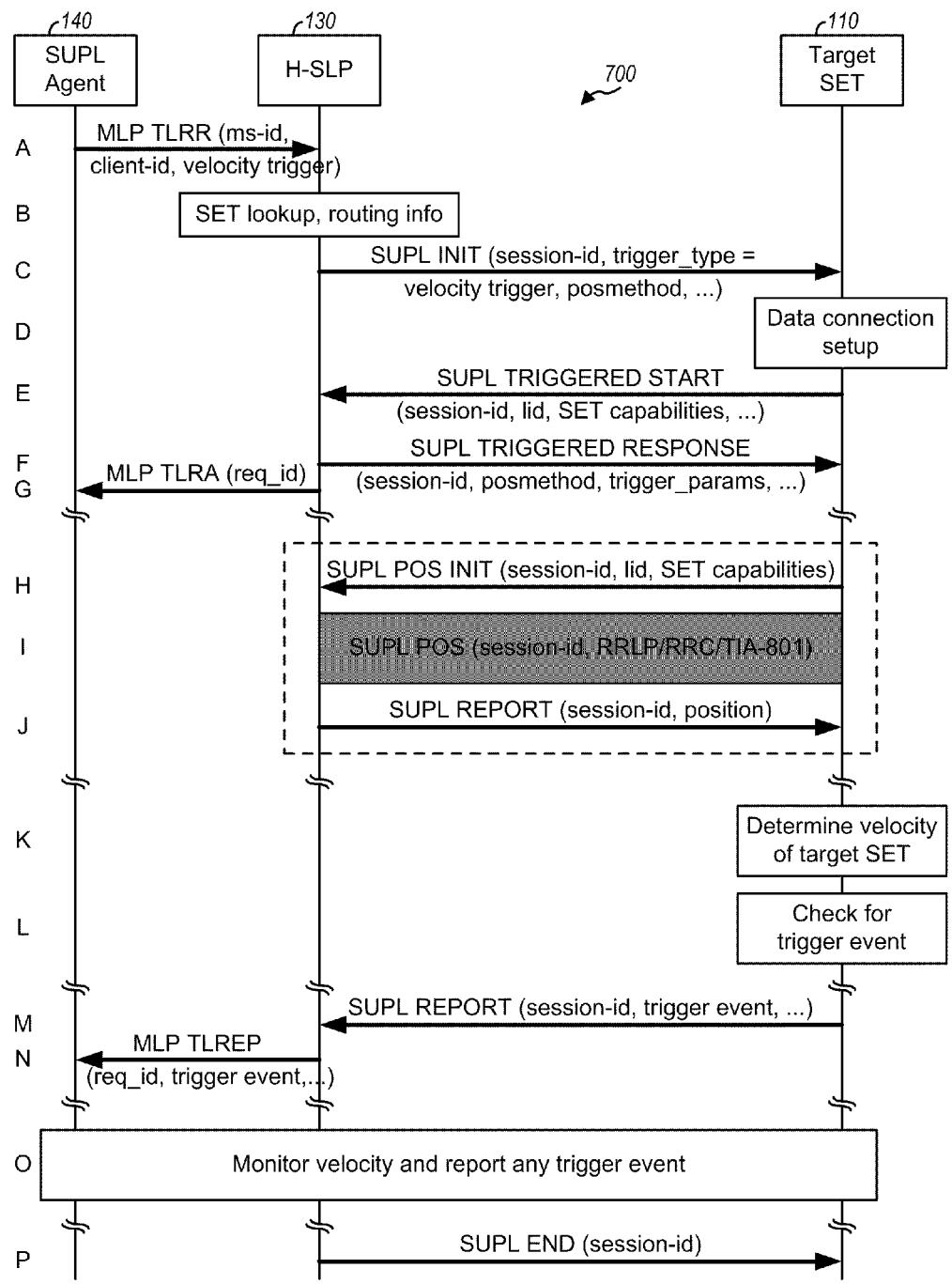
FIG. 7 illustrates a message flow for the velocity triggered service.

FIG. 7 shows a design of a message flow 700 for velocity triggered service using SUPL messages. SUPL agent 140 may desire to know whenever the velocity of target SET 110 has reached a target velocity and may send an MLP TLRR message to H-SLP 130 (step A). The MLP TLRR message may include the SUPL agent identity, the target SET identity, an indication of velocity triggered service being requested, trigger parameters, etc. The trigger parameters may include the target velocity, start time, stop time, etc. H-SLP 130 may authenticate and authorize SUPL agent 140 for the velocity triggered service. H-SLP 130 may also perform notification and/or verification with target SET 110. The velocity triggered service may also dynamically take into account modifications of the privacy settings of the target SET user.

H-SLP 130 may look up SET 110 and obtain routing information for the SET (step B). H-SLP 130 may send a SUPL INIT message to SET 110 to initiate a SUPL session for the velocity triggered service (step C). SET 110 may receive the SUPL INIT message and attach itself or establish a data connection (step D). SET 110 may evaluate notification rules and follow appropriate actions. SET 110 may then send a SUPL TRIGGERED START message to start the velocity triggered session with H-SLP 130 (step E). H-SLP 130 may receive the SUPL TRIGGERED START message, select a positioning method to use for SET 110, and return a SUPL TRIGGERED RESPONSE message that may include the session ID, the selected positioning method, the trigger parameters, etc. (step F). H-SLP 130 may send an MLP TLRA message to inform SUPL agent 140 that the velocity triggered service has been accepted (step G).

H-SLP 130 and target SET 110 may thereafter collaborate to detect for occurrence of a trigger event. The velocity of SET 110 may be determined periodically (e.g., every X seconds) during the session. In one design, a SET may autonomously make measurements and determine its velocity. In another design, a SET may interact with H-SLP 130 to determine its velocity. In general, the velocity of SET 110 may be determined solely by SET 110, by SET 110 with assistance from H-SLP 130, by H-SLP 130 with assistance from SET 110, etc. Target SET 110 may perform steps H, I and J, as necessary, to obtain assistance data from H-SLP 130 or to determine its velocity for the SET-assisted mode.

In one design, target SET 110 may check for a trigger event and initiate reporting. SET 110 may determine its velocity (step K). SET 110 may compare its current velocity against the target velocity and may determine whether the current velocity has exceeded the target velocity (step L). If a trigger event has occurred, then target SET 110 may send a SUPL REPORT message with an indication of a trigger event and possibly its velocity to H-SLP 130 (step M). H-SLP 130 may then send to SUPL agent 140 an MLP TLREP message that may include the request ID, a trigger event indication, the velocity of SET 110, the location of SET 110, etc. (step N). In another design, H-SLP 130 may check for a trigger event and initiate reporting. In general, any entity may be designated to perform the check and initiate reporting. The designated entity may be provided with the velocity of SET 110 and the trigger parameters.

Steps K through N are for one processing cycle. Additional processing cycles may be performed in similar manner (step O). Each processing cycle may include steps to determine the velocity of SET 110 and to determine whether a trigger event has occurred. Reporting may be initiated if a trigger event has occurred and may be skipped otherwise. The end of the velocity triggered session may be reached, e.g., when the stop time is reached, etc. Upon reaching the end of the velocity triggered session, H-SLP 130 and SET 110 may terminate the session. H-SLP 130 may send a SUPL END message to SET 110 (step P). H-SLP 130 may also notify SUPL agent 140 of the session end.

The velocity triggered service may be used to periodically monitor a target terminal and send a notification to a third party (e.g., SUPL agent 140) whenever the velocity of the target terminal reaches a predefined level. The third party may send a location request to a location server (e.g., H-SLP 130). The location server in collaboration with the target terminal may start a position and velocity determination procedure. The procedure may allow for detection of the terminal velocity exceeding the predefined level. Whenever this trigger event is detected, the location server may notify the location client. This service may be used, e.g., by an operations center of a trucking company that may want to know whenever their trucks exceed 70 mph. This service may also be used by an insurance company to verify that its policy holders generally adhere to local speed limits, e.g., which may then entitle the policy holder to lower insurance premium.

The T-D-V combination triggered service may support trigger events defined based on a combination of elapsed time since last report, distance traveled since last report, and maximum velocity reached since last report. The T-D-V combination triggered service may also support other combinations of elapsed time, distance traveled, maximum velocity, and/or other parameters. For example, a T-D-V combination trigger (or trigger condition) may be defined based on one of the following functions of time, distance, and velocity:

$$f(T) \text{ AND/OR } g(D) \text{ AND/OR } h(V), \text{ or} \qquad \text{Eq (1)}$$

$$[f_1(T) \text{ AND/OR } g(D)] \text{ AND/OR } [f_2(T) \text{ AND/OR } h(V)], \qquad \text{Eq (2)}$$

where T, D and V are current values for elapsed time, traveled distance, and maximum velocity since last report, respectively, f(T) is an expression (e.g., a Boolean expression) for a time trigger, g(D) is an expression (e.g., a Boolean expression) for a distance trigger, h(V) is an expression (e.g., a Boolean expression) for a velocity trigger, "AND" denotes a logical AND operation, and "OR" denotes a logical OR operation.

A Boolean expression may return a true or false output based on a function of its input parameters. As an example, a Boolean expression for traveled distance may be defined as $g(D)=(D \geq D1)$, where D1 is a predefined distance. The expression would be true if the traveled distance D is equal to or greater than the predefined distance D1 and would be false otherwise. $f_1(T)$ and $f_2(T)$ may be two Boolean expressions for a time trigger given by $f_i(T)=(T \geq T_i)$, for i=1 or 2, where $T_1$ and $T_2$ are two predefined values for elapsed time. Expressions for velocity trigger may be defined in similar manner. Once any trigger condition occurs, it may remain valid until the next report. This would prevent a trigger from occurring and then later disappearing, until after a new report is sent.

For example, a fleet management center may want updates on movement of its trucks with an interest in reports whenever a truck has moved 10 miles (D1=10 miles) since the last report but with no more than one report per truck every hour (T1=60 minutes). The center may also want to be notified immediately if a truck reaches 75 mph (V1=75 mph). A combo trigger function may be defined as follows:

$$[(T \geq 60 \text{ minutes}) \text{ AND } (D \geq 10 \text{ miles})] \text{ OR } (V \geq 75 \text{ mph}),$$

where T is the time elapsed since the last report was sent,

D is the distance traveled since the last report, and

V is the maximum speed since the last report.

The traveled distance D may be computed as (i) a sum of incremental distances between location measurements or (ii) the distance to the location in the last report. For example, variables T, D for case (i), and V may all be increasing functions of time.

To avoid generating excessive reports for speeding drivers, the center may desire no more than one speeding report every 10 minutes (T2=10 minutes). A combo trigger function may then be defined as follows:

$$[(T \geq 60 \text{ minutes}) \text{ AND } (D \geq 10 \text{ miles})] \text{ OR } [(T \geq 10 \text{ minutes}) \text{ AND } (V \geq 75 \text{ mph})].$$

As shown by the equation above, different predefined time values may be used with different predefined values for D and V.

In one design, to enable greater flexibility for the T-D-V combination triggered service, the Boolean expressions above (e.g., f(T), g(D) and h(V)) may include or may depend on the current location of the SET, a set of SET locations since the last report, the current time or the time period since the last report, etc. This may be used to set different predefined values for distance traveled, maximum velocity, and time until the next report. For example, a trucking company may adjust a predefined maximum velocity according to a prevailing (e.g., maximum) speed limit for the locations traveled since the last report. The company may also adjust a predefined distance traveled according to the type of route, e.g., using a higher predefined distance for a truck traveling along a major highway. The company may also adjust a predefined time interval according to the time of day, e.g., using a smaller interval for busy travel periods in a day and a longer interval for less busy periods such as evenings and nights.

Figure 8:
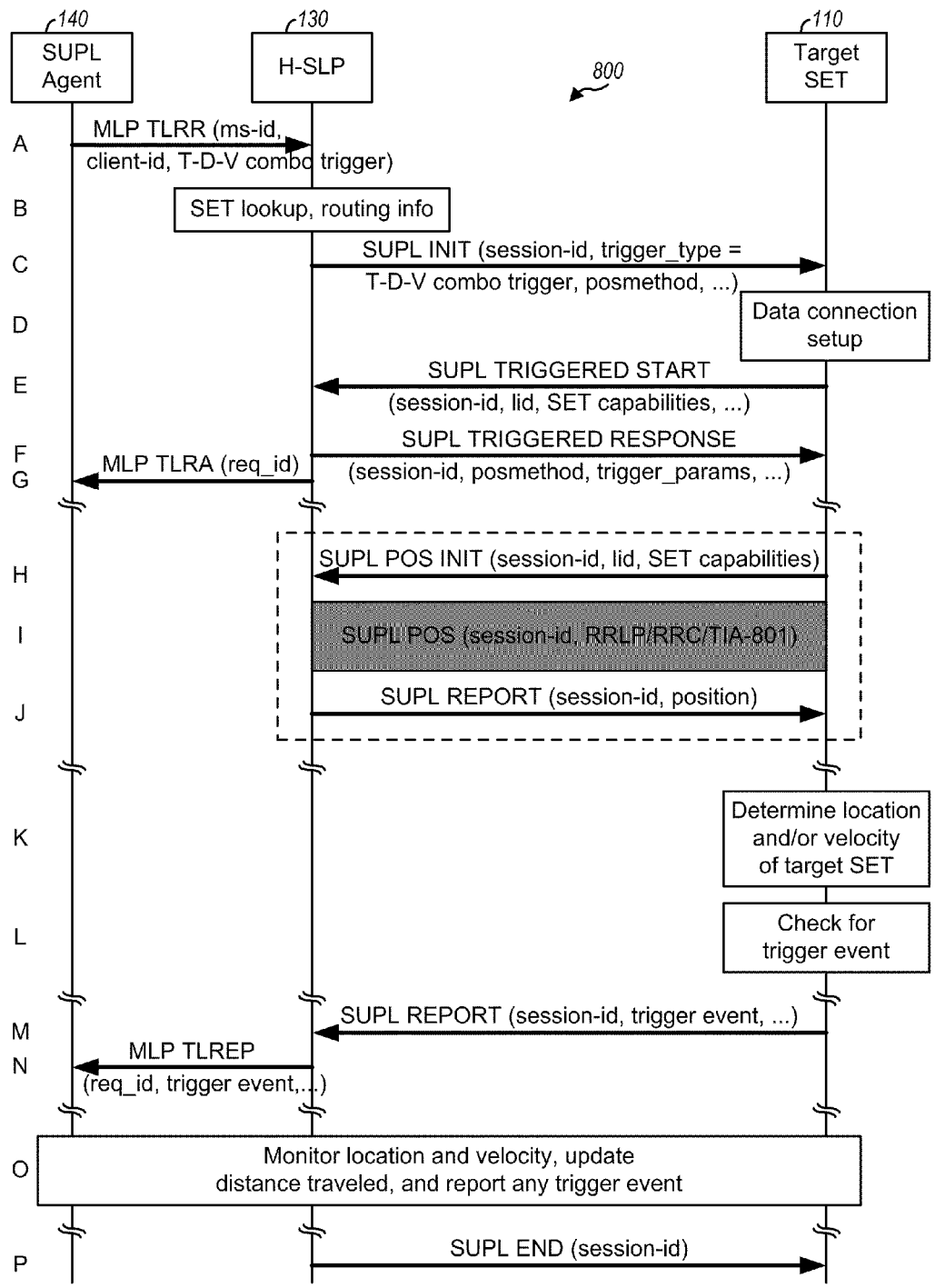
FIG. 8 illustrates a message flow for the T-D-V combination triggered service.

FIG. 8 shows a design of a message flow 800 for the T-D-V combination triggered service using SUPL messages. SUPL agent 140 may desire to know location and/or velocity information for target SET 110 and may send an MLP TLRR message to H-SLP 130 (step A). The MLP TLRR message may include the SUPL agent identity, the target SET identity, an indication of T-D-V combination triggered service being requested, trigger parameters, etc. The trigger parameters may include T, D and/or V parameters, the desired combo trigger function, e.g., $[(T \geq T1) \text{ AND } (D \geq D1)) \text{ OR } (V \geq V1)])$, start time, stop time, etc. H-SLP 130 may authenticate and authorize SUPL agent 140 for the T-D-V combination triggered service. H-SLP 130 may also perform notification and/or verification with target SET 110. The T-D-V combination triggered service may also dynamically take into account modifications of the privacy settings of the target SET user.

H-SLP 130 may look up SET 110 and obtain routing information for the SET (step B). H-SLP 130 may send a SUPL INIT message to SET 110 to initiate a SUPL session for the T-D-V combination triggered service (step C). SET 110 may receive the SUPL INIT message and attach itself or establish a data connection (step D). SET 110 may evaluate notification rules and follow appropriate actions. SET 110 may then send a SUPL TRIGGERED START message to start the T-D-V combination triggered session with H-SLP 130 (step E). H-SLP 130 may receive the SUPL TRIGGERED START message, select a positioning method to use for SET 110, and return a SUPL TRIGGERED RESPONSE message that may include the session ID, the selected positioning method, the trigger parameters, etc. (step F). H-SLP 130 may send an MLP TLRA message to inform SUPL agent 140 that the T-D-V combination triggered service has been accepted (step G).

Target SET 110 may perform steps H, I and J, as necessary, to obtain assistance data from H-SLP 130, or to determine its location and/or velocity for the SET-assisted mode. H-SLP 130 and target SET 110 may collaborate to detect for occurrence of a trigger event. The location and/or velocity of SET 110 may be determined periodically (e.g., every X seconds) during the session. In one design, SET 110 may autonomously make measurements and determine its location and/or velocity (step K). In another design, SET 110 may interact with H-SLP 130 to determine its location and/or velocity (e.g., using steps H, I and J in FIG. 8). In general, the location and/or velocity of SET 110 may be determined solely by SET 110, by SET 110 with assistance from H-SLP 130, by H-SLP 130 with assistance from SET 110, etc.

In one design, target SET 110 may check for a trigger event and initiate reporting. SET 110 may determine the current T, D and V values and may logically combine these values in accordance with the combo trigger function to determine whether a trigger event has occurred (step L). If a trigger event has occurred, then target SET 110 may send a SUPL REPORT message with an trigger event indication and possibly its location and/or velocity to H-SLP 130 (step M). In another design, H-SLP 130 may check for a trigger event and initiate reporting. In any case, in response to a trigger event, H-SLP 130 may send to SUPL agent 140 an MLP TLREP message that may include the request ID, a trigger event indication, the location and/or velocity of SET 110, the conditions for the trigger that had occurred, and/or other information (step N).

Steps K through N are for one processing cycle. Additional processing cycles may be performed in similar manner (step O). Each processing cycle may include steps to determine the location and/or velocity of SET 110, to update the distance traveled by SET 110, and to determine whether a trigger event has occurred. Reporting may be initiated if a trigger event has occurred and may be skipped otherwise. Upon reaching the end of the T-D-V combination triggered session (e.g., when the stop time is reached), H-SLP 130 and SET 110 may terminate the session. H-SLP 130 may send a SUPL END message to SET 110 (step P). H-SLP 130 may also notify SUPL agent 140 of the session end.

The T-D-V combination triggered service may be used to periodically monitor a target terminal and send a notification to a third party (e.g., SUPL agent 140) whenever a trigger event based on time T, distance D, and/or velocity V occurs. The third party may send a location request to a location server (e.g., H-SLP 130). The location server and the target terminal may collaborate to detect for occurrence of a trigger event based on the location and/or velocity of the terminal Whenever a trigger event is detected, the location server may notify the location client.

In another aspect, a SET to SET velocity service may enable a requesting SET to obtain the absolute or relative velocity of one or more target SETs on an ongoing basis (e.g., periodically, once, etc.) during a SET to SET velocity session. A SUPL agent may reside in the requesting SET and may request the velocity of the target SET(s). Each SET may be capable of executing a positioning procedure with an H-SLP and/or on its own. The positioning procedure may provide location information, which may include the location and/or velocity of the SET.

Figure 9:
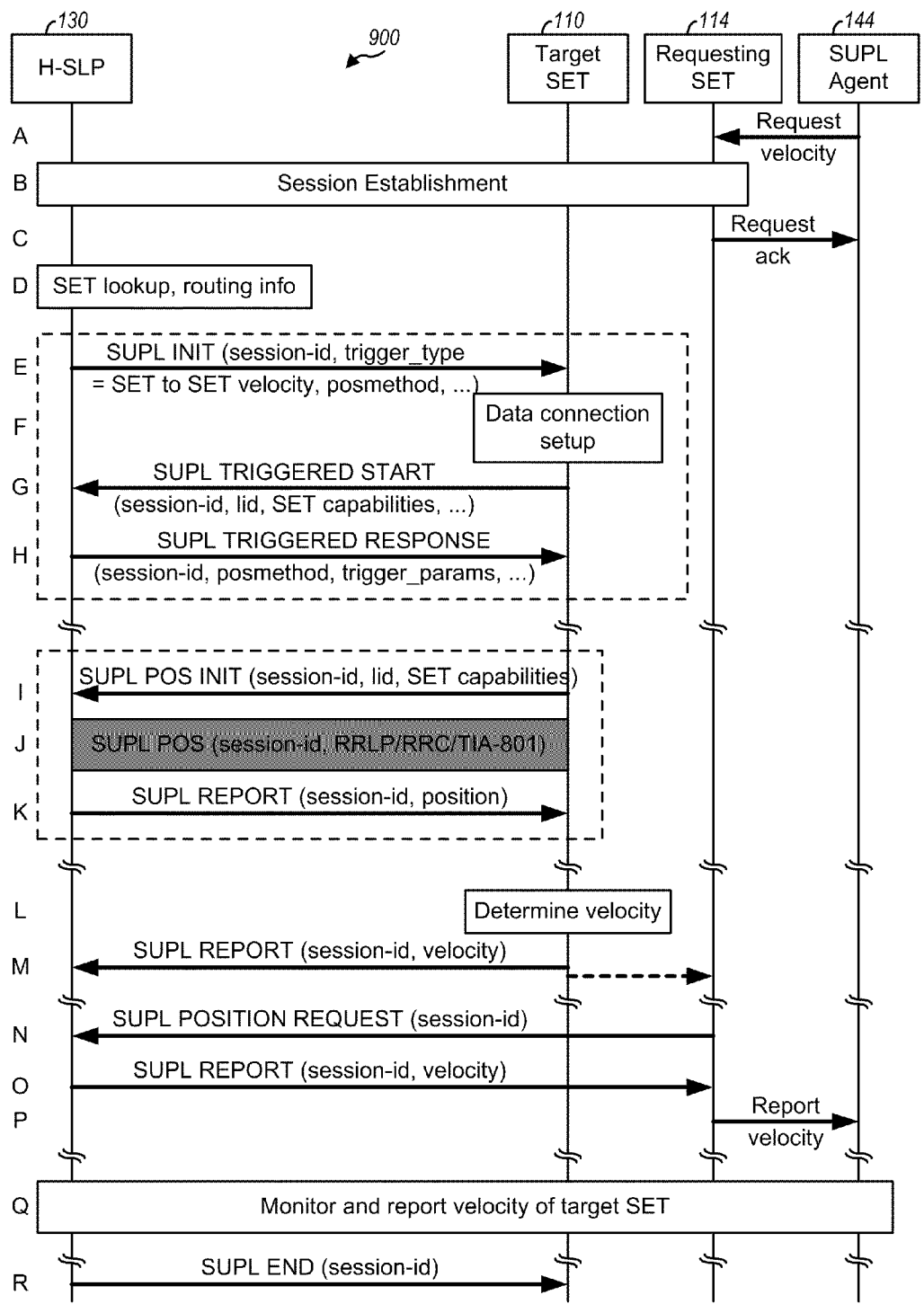
FIG. 9 illustrates a message flow for a terminal to terminal velocity service.

FIG. 9 shows a design of a message flow 900 for SET to SET velocity service using SUPL messages. SUPL agent 144 in requesting SET 114 may desire to know the velocity of target SET 110. Since SUPL agent 144 resides in SET 114, a SET initiated service may be used, and SUPL agent 144 may internally request SET 114 to initiate the SET to SET velocity service (step A). Requesting SET 114 may then communicate with H-SLP 130 to establish a SET-initiated triggered session (step B). The session establishment in step B may include (i) SET 114 sending a SUPL TRIGGERED START message to H-SLP 130 and (ii) H-SLP 130 returning a SUPL TRIGGERED RESPONSE message to SET 114. The SUPL TRIGGERED START message may indicate SET to SET velocity service being requested and may also include information such as the requesting SET identity, the target SET identity, an indication of whether relative or absolute velocity is requested, start time and stop time of the session, number of fixes, interval between fixes, etc. H-SLP 130 may authenticate and authorize SET 114 for the SET to SET velocity service. Following session establishment in step B, SET 114 may acknowledge the request internally to SUPL agent 144 and may confirm that the requested service will be performed (step C). H-SLP 130 may establish a location session with target SET 110 (steps D to H). This may include notification and/or verification with SET 110.

H-SLP 130 may collaborate with requesting SET 114 and/or target SET 110 to determine the velocity of target SET 110, determine the velocity of reference SET 114, provide assistance to target SET 110, and/or provide assistance to reference SET 114 during the session. H-SLP 130 may also be involved in sharing the velocity of target SET 110 with requesting SET 114 and/or the velocity of requesting SET 114 with target SET 110 during the session.

Target SET 110 may perform steps I, J and K, as necessary, to obtain assistance data from H-SLP 130 or to determine its velocity for the SET-assisted mode. Similarly, reference SET 114 may perform steps I, J and K, as necessary, to obtain assistance data from H-SLP 130 or to determine its velocity. Target SET 110 may determine its velocity (step L) and may send a SUPL REPORT message with its velocity to H-SLP 130 (step M). Requesting SET 114 may send a SUPL POSITION REQUEST message to H-SLP 130 to request for the velocity of target SET 110 (step N). In response, H-SLP 130 may forward the current velocity of target SET 110 in a SUPL REPORT message to requesting SET 114 (step O). H-SLP 130 may also forward the velocity of target SET 110 whenever it is received from SET 110. Target SET 110 may also send its velocity directly to requesting SET 114 without interacting with H-SLP 130 (e.g., as indicated by a dashed line in FIG. 9). In any case, requesting SET 114 may provide the velocity of target SET 110 to SUPL agent 144 (step P).

Steps L through P are for one processing cycle. Additional processing cycles may be performed in similar manner (step Q). Each processing cycle may include steps to determine the velocity of target SET 110 and to provide the velocity to requesting SET 114. The end of the SET to SET velocity session may be reached, e.g., when the stop time is reached, etc. Upon reaching the end of the session, H-SLP 130, requesting SET 114, and target SET 110 may terminate the session. H-SLP 130 may send a SUPL END message to target SET 110 (step R). H-SLP 130 may also notify requesting SET 114 of the session end, and SET 114 may then notify SUPL agent 144.

For simplicity, FIG. 9 shows a case in which requesting SET 114 requests for the velocity of one target SET 110. Requesting SET 114 may also request for the velocity of multiple target SETs. Each target SET may perform processing as shown in FIG. 9 for target SET 110.

In another design that is based on FIG. 9, requesting SET 114 may determine its velocity relative to target SET 110 by exchanging signals (e.g., radio signals or infrared signals) directly with target SET 110. Either SET may measure a round trip signal propagation delay and may obtain a straight line distance between the SETs based on the signal measurement. By repeating the signal measurement and distance calculation at short intervals, either SET may obtain the relative velocity of one SET with respect to the other. Alternatively, if the signals exchanged between the SETs include a fixed and known frequency component or some marker within the signal that is repeated at fixed known intervals, then either SET may obtain its relative velocity with respect to the other SET by measuring the change in frequency of the frequency component or periodic marker. This signal exchange and measurement procedure may replace steps I to L in FIG. 9 for both SETs.

FIGS. 3 and 6-9 show exemplary message flows for different location services using SUPL messages. The message flows may be varied. For example, SUPL agent 140 may request H-SLP 130 to terminate an ongoing session. H-SLP 130, SET 110, and/or SET 112 may also decide to terminate an ongoing session. In these cases, H-SLP 130, SET 110, and SET 112 (if present) may take action to terminate the session. SUPL agent 140, H-SLP 130, SET 110, or SET 112 (if present) may request that the service be paused. In this case, position determination and trigger events detection may be paused (i.e., not performed) until a request for resumption of the service is made by the entity requesting the pause.

The location services described herein may allow a SUPL agent to obtain location information for a target SET with a single location request to an H-SLP instead of making multiple requests and evaluating the results. The triggered location services may reduce the number of location requests and may greatly reduce the amount of signaling and processing for all affected entities such as the SUPL agent, the H-SLP, and the target SET.

FIG. 10 shows a design of a process 1000 for supporting triggered location services. Process 1000 may be performed by a terminal/SET, an H-SLP, or some other entity. At least one location related measurement for a terminal may be obtained (block 1012). Each location related measurement may be for the distance traveled by the terminal, or the velocity of the terminal, or the location of the terminal relative to a moving geographical target area. Whether a trigger event has occurred may be determined based on the at least one location related measurement for the terminal (block 1014). A report may be sent if a trigger event has occurred (block 1016).

In one design, for the equidistance triggered service, the at least one location related measurement may be for the distance traveled by the terminal. The distance traveled by the terminal may be determined in various manners. In one design, the distance traveled may be determined by (i) periodically determining the location of the terminal and (ii) accumulating the incremental distances between successive locations of the terminal since a last trigger event (or the start of the triggered session). In another design, the distance traveled may be determined based on the distance between the current location of the terminal and a starting location, which may be the location of the terminal at the last trigger event. In yet another design, the distance traveled may be determined based on the distance between the current location of the terminal and the starting location along a particular route. This particular route may be along a straight line trajectory or a more complex route. The distance traveled by the terminal may also be determined in other manners. In any case, whether a trigger event has occurred may be determined based on the distance traveled by the terminal. For example, a trigger event may be declared if the distance traveled by the terminal exceeds a predefined distance.

In another design, for the relative SET to SET triggered service, the at least one location related measurement may be for the location of the terminal relative to a moving geographical target area. The moving geographical target area may be determined based on the location of a reference terminal. For example, the moving geographical target area may be a circular area centered at the location of the reference terminal and having a predefined radius. Whether a trigger event has occurred may be determined based on the location of the terminal relative to the moving geographical target area. For example, a trigger event may be declared if the location of the terminal matches a criterion with respect to the moving geographical target area. The criterion may be inside, outside, entering or leaving the moving geographical target area.

In yet another design, for the velocity triggered service, the at least one location related measurement for the terminal may be for the velocity of the terminal. Velocity may include only speed, or only bearing, or both speed and bearing. Whether a trigger event has occurred may be determined based on the velocity of the terminal. For example, the velocity of the terminal may be determined periodically. A trigger event may be declared if the velocity of the terminal at any time since the last trigger event meets or exceeds a predefined velocity.

In yet another design, for the T-D-V combination triggered service, the at least one location related measurement may be for the distance traveled by the terminal and the velocity of the terminal Whether a trigger event has occurred may be determined based on the distance traveled by the terminal, the velocity of the terminal, and/or elapsed time since the last trigger event. For example, multiple expressions may be determined. Each expression may be for the distance traveled by the terminal relative to a predefined distance, or a maximum velocity of the terminal relative to a predefined velocity, or elapsed time relative to a predefined time. Whether a trigger event has occurred may be determined based on a function of the multiple expressions.

FIG. 11 shows a design of a process 1100 for supporting SET to SET velocity service. Process 1100 may be performed by a first terminal/SET. The first terminal may send a request for the velocity of a second terminal, e.g., to a location center such as an H-SLP (block 1112). The first terminal may thereafter receive the velocity of the second terminal, e.g., from the location center, or directly from the second terminal without going through the location center (block 1114). The first terminal may receive the velocity of the second terminal either once or a plurality of times (e.g., periodically) in response to the request.

FIG. 12 shows a block diagram of a design of terminal/SET 110, wireless network 120, and location server/H-SLP 130 in FIG. 1. For simplicity, FIG. 12 shows one or more controller/processors 1210, one memory 1212, and one transmitter/receiver (TMTR/RCVR) 1214 for terminal 110, one or more controller/processors 1220, one memory 1222, one transmitter/receiver 1224, and one communication (Comm) unit 1226 for wireless network 120, and one or more controller/processors 1230, one memory 1232, and one communication unit 1234 for H-SLP 130. In general, each entity may include any number of processors, controllers, memories, transmitters/receivers, communication units, etc. Terminal 110 may support communication with one or more wireless and/or wireline networks. Terminal 110 may also receive and process signals from one or more satellite positioning systems, e.g., GPS, Galileo, etc.

On the downlink, wireless network 120 may transmit traffic data, signaling, and pilot to terminals within its coverage area. These various types of information may be processed by processor(s) 1220, conditioned by transmitter 1224, and transmitted on the downlink. At terminal 110, downlink signals from wireless network 120 may be received and conditioned by receiver 1214 and further processed by processor(s) 1210 to obtain various types of information. Processor(s) 1210 may perform process 1000 in FIG. 10, process 1100 in FIG. 11, and/or other processes for the techniques described herein. Processor(s) 1210 may also perform processing for any SET in FIGS. 2, 3 and 5-9. Memories 1212 and 1222 may store program codes and data for terminal 110 and wireless network 120, respectively. On the uplink, terminal 110 may transmit traffic data, signaling, and pilot to wireless network 120. These various types of information may be processed by processor(s) 1210, conditioned by transmitter 1214, and transmitted on the uplink. At wireless network 120, the uplink signals from terminal 110 and other terminals may be received and conditioned by receiver 1224 and further processed by processor(s) 1220 to obtain various types of information from the terminals. Wireless network 120 may directly or indirectly communicate with H-SLP 130 via communication unit 1226.

Within H-SLP 130, processor(s) 1230 may perform processing to support location services for terminals. For example, processor(s) 1230 may perform process 1000 in FIG. 10 and/or other processes for the techniques described herein. Processor(s) 1230 may also perform processing for H-SLP 130 in FIGS. 2, 3 and 5-9. Processor(s) 1230 may also compute location estimates for terminal 110, provide location information to SUPL agent 140, etc. Memory 1232 may store program codes and data for H-SLP 130. Communication unit 1234 may allow H-SLP 130 to communicate with wireless network 120, terminal 110, and/or other network entities. H-SLP 130 and terminal 110 may exchange messages via a user plane (e.g., SUPL), and these messages may be transported by wireless network 120.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a terminal refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "terminal" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "terminal" is intended to include all devices, including wireless communication devices, computers, laptops, etc. which are capable of communication with a server, such as via the Internet, Wi-Fi, femtocells, or other network, and regardless of whether satellite signal reception, assistance data reception, and/or position-related processing occurs at the device, at a server, or at another device associated with the network. Any operable combination of the above are also considered a "terminal".

The methodologies/implementations described herein may be implemented by various means depending upon the application. For example, they may be implemented in hardware, firmware, software, or any combination thereof. For an implementation involving hardware, the processors may be implemented with one or more application specific integrated circuits (ASICs), digital signal processors (DSPs), digital signal processing devices (DSPDs), programmable logic devices (PLDs), field programmable gate arrays (FPGAs), general purpose processors, controllers, micro-controllers, microprocessors, state machines, electronic devices, other electronic units designed to perform the functions described herein, or a combination thereof, for example, one or more microprocessors in conjunction with a DSP core, a plurality of microprocessors, or any other suitable configuration.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, firmware/software codes may be stored in a memory and executed by a processor/computer to cause the processor/computer to perform functions. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of a computer program product. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Headings are included herein for reference and to aid in locating certain sections. These headings are not intended to limit the scope of the concepts described therein under, and these concepts may have applicability in other sections throughout the entire specification.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of supporting location services, comprising:
   receiving, at a target mobile terminal, at least one trigger parameter associated with a trigger event, the at least one trigger parameter defining a moving geographical target area that is associated with a location of a reference mobile terminal and that is configured to move in synch with the reference mobile terminal;
   receiving, at the target mobile terminal, the location of the reference mobile terminal;
   obtaining at least one location related measurement for the target mobile terminal;
   determining, at the target mobile terminal, a location of the moving geographical target area based on the location of the reference mobile terminal;
   determining, at the target mobile terminal, a location of the target mobile terminal relative to the moving geographical target area based at least in part on the at least one location related measurement for the target mobile terminal; and
   determining, at the target mobile terminal, whether the trigger event has occurred based on the at least one location related measurement for the target mobile terminal and the at least one trigger parameter, and based at least in part on the location of the target mobile terminal relative to the moving geographical target area, wherein the determining whether the trigger event has occurred comprises determining whether the location of the target mobile terminal matches a criterion with respect to the moving geographical target area, the criterion comprising inside the moving geographical target area, outside the moving geographical target area, entering the moving geographical target area, leaving the moving geographical target area, or a combination thereof.

2. The method of claim 1, wherein a shape of the moving geographical target area is a circular area centered at the location of the reference mobile terminal and having a predefined radius.

3. The method of claim 1, wherein the at least one location related measurement for the target mobile terminal is obtained based on at least one signal exchanged between the target mobile terminal and the reference mobile terminal.

4. The method of claim 1 wherein the at least one trigger parameter includes a Secure User Plane Location (SUPL) trigger parameter.

5. The method of claim 1, further comprising: exchanging Secure User Plane Location (SUPL) messages to obtain the at least one location related measurement.

6. The method of claim 1, wherein the moving geographical target area comprises a complex polygon.

7. An apparatus for supporting location services, comprising:
   means for receiving, at a target mobile terminal, at least one trigger parameter associated with a trigger event, the at least one trigger parameter defining a moving geographical target area that is associated with a location of a reference mobile terminal and that is configured to move in synch with the reference mobile terminal;
   means for receiving, at the target mobile terminal, a location of the reference mobile terminal;
   means for obtaining at least one location related measurement for the target mobile terminal;

means for determining, at the target mobile terminal, a location of the moving geographical target area based on the location of the reference mobile terminal;

means for determining, at the target mobile terminal, a location of the target mobile terminal relative to the moving geographical target area based at least in part on the at least one location related measurement for the target mobile terminal; and means for determining, at the target mobile terminal, whether the trigger event has occurred based on the at least one location related measurement for the target mobile terminal and the at least one trigger parameter, and based at least in part on the location of the target mobile terminal relative to the moving geographical target area associated with the reference mobile terminal, wherein the means for determining whether the trigger event has occurred comprises means for determining whether the location of the target mobile terminal matches a criterion with respect to the moving geographical target area, the criterion being inside the moving geographical target area, outside the moving geographical target area, entering the moving geographical target area, leaving the moving geographical target area, or a combination thereof.

8. An apparatus for supporting location services, comprising: at least one processor configured to:

receive, at a target mobile terminal, at least one trigger parameter associated with a trigger event, the at least one trigger parameter defining a moving geographical target area that is associated with a location of a reference mobile terminal and that is configured to move in synch with the reference mobile terminal;

receive, at the target mobile terminal, a location of the reference mobile terminal;

obtain at least one location related measurement for a target mobile terminal;

determine, at the target mobile terminal, a location of the moving geographical target area based on the location of the reference mobile terminal;

determine, at the target mobile terminal, a location of the target mobile terminal relative to the moving geographical target area based at least in part on the at least one location related measurement for the target mobile terminal; and determine, at the target mobile terminal, whether the trigger event has occurred based on the at least one location related measurement for the target mobile terminal, and based, at least in part, on the location of the target mobile terminal relative to the moving geographical target area, wherein to determine whether the trigger event has occurred the at least one processor is configured to determine whether the location of the target mobile terminal matches a criterion with respect to the moving geographical target area, the criterion being inside the moving geographical target area, outside the moving geographical target area, entering the geographical target area, leaving the moving geographical target area, or a combination thereof.

9. A non-transitory computer-readable medium residing on a mobile terminal that includes at least one computer, the computer-readable medium comprising code to cause the at least one computer to:

receive at least one trigger parameter associated with a trigger event, the at least one trigger parameter defining a moving geographical target area that is associated with a location of a reference mobile terminal and that is configured to move in synch with the reference mobile terminal;

receive a location of the reference mobile terminal;

obtain at least one location related measurement for a target mobile terminal;

determine a location of the moving geographical target area based on the location of the reference mobile terminal;

determine a location of the target mobile terminal relative to the moving geographical target area based at least in part on the at least one location related measurement for the target mobile terminal; and determine whether the trigger event has occurred based on the at least one location related measurement for the target mobile terminal, and based, at least in part, on the location of the target mobile terminal relative to the moving geographical target area, wherein the code to cause the at least one computer to determine whether the trigger event has occurred comprises code to cause the at least one computer to determine whether the location of the target mobile terminal matches a criterion with respect to the moving geographical target area, the criterion being inside the moving geographical target area, outside the moving geographical target area, entering the geographical target area, leaving the moving geographical target area, or a combination thereof.

10. The computer-readable medium of claim 9, wherein a shape of the moving geographical target area is a circular area centered at the location of the reference mobile terminal and having a predefined radius.

11. The computer-readable medium of claim 9, wherein the moving geographical target area comprises a complex polygon.

12. The computer-readable medium of claim 9, wherein the code to cause the at least one computer to obtain the at least one location related measurement includes code to cause the at least one computer to exchange Secure User Plane Location (SUPL) messages.

* * * * *